(12) United States Patent
Tanaka et al.

(10) Patent No.: US 12,218,606 B2
(45) Date of Patent: Feb. 4, 2025

(54) POWER CONVERSION DEVICE

(71) Applicant: Mitsubishi Electric Corporation, Tokyo (JP)

(72) Inventors: Miwako Tanaka, Tokyo (JP); Toshiyuki Fujii, Tokyo (JP); Takuya Kajiyama, Tokyo (JP); Akito Nakayama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/276,274

(22) PCT Filed: Apr. 5, 2021

(86) PCT No.: PCT/JP2021/014451
§ 371 (c)(1),
(2) Date: Aug. 8, 2023

(87) PCT Pub. No.: WO2022/215106
PCT Pub. Date: Oct. 13, 2022

(65) Prior Publication Data
US 2024/0128887 A1    Apr. 18, 2024

(51) Int. Cl.
*H02M 7/483*  (2007.01)
*H02M 1/00*   (2006.01)
(Continued)

(52) U.S. Cl.
CPC ......... *H02M 7/1557* (2013.01); *H02M 1/009* (2021.05); *H02M 1/084* (2013.01);
(Continued)

(58) Field of Classification Search
CPC ...... H02M 1/0003; H02M 1/009; H02M 1/08; H02M 1/084; H02M 1/12; H02M 1/123;
(Continued)

(56) References Cited

U.S. PATENT DOCUMENTS

| | | | |
|---|---|---|---|
| 2013/0148392 A1* | 6/2013 | Inoue | H02M 7/10 363/68 |
| 2013/0208519 A1* | 8/2013 | Yamamoto | H02M 7/48 363/67 |

(Continued)

FOREIGN PATENT DOCUMENTS

| | | |
|---|---|---|
| EP | 2 602 927 A2 | 6/2013 |
| JP | 5455055 B2 | 3/2014 |

(Continued)

OTHER PUBLICATIONS

International Search Report and Written Opinion mailed on Jun. 22, 2021, received for PCT Application PCT/JP2021/014451, filed on Apr. 5, 2021, 8 pages including English Translation.

(Continued)

*Primary Examiner* — Thienvu V Tran
*Assistant Examiner* — Shahzeb K Ahmad
(74) *Attorney, Agent, or Firm* — XSENSUS LLP

(57) ABSTRACT

A first voltage control circuitry controls a first representative value, i.e., an average-value corresponding value of DC capacitor voltages of all converter cells to follow an overall voltage command value. A phase balance control circuitry controls second representative values, i.e., average-value corresponding values of DC capacitor voltages of the converter cells in leg circuits for respective phases to follow the first representative value. A positive-negative balance control circuitry controls deviations of third representative values, i.e., average-value corresponding values of the DC capacitor voltages of the converter cells in the positive and negative arms of the leg circuits for respective phases to become zero between the positive and negative arms. An individual balance control circuitry controls DC capacitor voltages of all the converter cells to follow the third representative values.

20 Claims, 14 Drawing Sheets

(51) Int. Cl.
*H02M 1/084* (2006.01)
*H02M 1/12* (2006.01)
*H02M 1/32* (2007.01)
*H02M 7/00* (2006.01)
*H02M 7/155* (2006.01)
*H02M 7/19* (2006.01)

(52) U.S. Cl.
CPC .............. *H02M 1/123* (2021.05); *H02M 1/32* (2013.01); *H02M 7/003* (2013.01); *H02M 7/19* (2013.01); *H02M 7/4833* (2021.05); *H02M 7/4835* (2021.05)

(58) Field of Classification Search
CPC ...... H02M 1/32; H02M 7/003; H02M 7/1557; H02M 7/19; H02M 7/48; H02M 7/483; H02M 7/4833; H02M 7/4835
See application file for complete search history.

(56) References Cited

U.S. PATENT DOCUMENTS

| | | | |
|---|---|---|---|
| 2016/0336874 A1* | 11/2016 | Kikuchi | H02M 7/483 |
| 2019/0044427 A1* | 2/2019 | Fujii | H02M 7/483 |
| 2020/0161960 A1* | 5/2020 | Mukunoki | H02J 3/26 |
| 2022/0029524 A1* | 1/2022 | Kajiyama | H02M 1/32 |
| 2023/0049159 A1 | 2/2023 | Tanaka et al. | |

FOREIGN PATENT DOCUMENTS

| | | | | |
|---|---|---|---|---|
| JP | 5721096 B2 | 5/2015 | | |
| JP | 5904834 B2 | 4/2016 | | |
| WO | WO-2020136699 A1 * | 7/2020 | ......... | H02M 1/0025 |
| WO | 2021/199150 A1 | 10/2021 | | |

OTHER PUBLICATIONS

Extended European Search Report issued Apr. 15, 2024 in European Patent Application No. 21935916.3, 8 pages.

* cited by examiner

POWER CONVERSION DEVICE

CROSS-REFERENCE TO RELATED APPLICATION

The present application is based on PCT filing PCT/JP2021/014451, filed Apr. 5, 2021, the entire contents of which are incorporated herein by reference.

TECHNICAL FIELD

The present disclosure relates to a power conversion device.

BACKGROUND ART

In recent years, in a power conversion device used for high-voltage application such as a power grid, a multilevel converter formed by connecting a plurality of converter cells in series in a multiplexed manner is being put into practice. Such a converter is called a modular multilevel converter (hereinafter, abbreviated as MMC) type, a cascaded multilevel converter (hereinafter, abbreviated as CMC) type, or the like, and is used for conversion from three-phase AC to DC or conversion opposite thereto, for example. The converter generates output voltage using DC capacitor voltages of the converter cells connected in series in a multiplexed manner.

CITATION LIST

Patent Document

Patent Document 1: Japanese Patent No. 5455055

SUMMARY OF THE INVENTION

Problem to be Solved by the Invention

DC capacitor voltage in each converter cell of the modular multilevel converter varies through charging/discharging of current flowing through an arm. Therefore, it is necessary to perform control for making a balance within a certain range so that voltage of each converter cell does not become overvoltage.

In a power conversion device described in Patent Document 1, in order to control capacitor voltages of converter cells of a modular multilevel converter so as to be constant, the following controls are performed: average value control for performing control so as to reach the average value of the capacitor voltages in each phase arm for each phase independently, individual balance control for balancing the capacitor voltage of each converter cell for each phase independently, and positive-negative arm balance control for balancing capacitor voltages in the positive and negative arms for each phase independently.

That is, in Patent Document 1, control is performed for each phase independently, to control the capacitor voltages of the converter cells so as to be constant.

An object of the present disclosure is to provide a power conversion device in which voltages of DC capacitors of all converter cells are kept within a certain range and the DC capacitor voltages of the converter cells are averaged, thereby preventing overvoltage of each converter cell.

Means to Solve the Problem

A power conversion device according to the present disclosure includes: a power converter which performs power conversion between an AC grid with a plurality of phases and a DC grid; and a control device which controls the power converter. The power converter includes leg circuits respectively corresponding to the plurality of phases of AC, the leg circuits each having a pair of a positive arm and a negative arm connected in series. Each of the positive arm and the negative arm includes one converter cell or a plurality of converter cells connected in series, the one or each converter cell including a series unit of a plurality of semiconductor switching elements connected in series and a DC capacitor connected in parallel to the series unit. A connection point between the positive arm and the negative arm is connected to the AC grid, and the plurality of leg circuits are connected in parallel between positive and negative DC buses of the DC grid. The control device includes: a first voltage control unit which performs control so that a first representative value which is an average-value corresponding value of DC capacitor voltages of all the converter cells follows a predetermined overall voltage command value, to generate a first voltage command value; a phase balance control unit which performs control so that a second representative value which is an average-value corresponding value of the DC capacitor voltages of the converter cells in the leg circuit for each phase follows the first representative value, to generate a second voltage command value; a positive-negative balance control unit which performs control so that a deviation of third representative values which are average-value corresponding values of the DC capacitor voltages of the converter cells in the positive arm and the negative arm of the leg circuit for each phase becomes zero between the positive arm and the negative arm of the leg circuit for each phase, to generate a third voltage command value; a voltage command value calculation unit which generates an arm modulation command for each arm on the basis of the first voltage command value, the second voltage command value, and the third voltage command value; an individual balance control unit which performs control so that the DC capacitor voltages of all the converter cells follow the third representative values, to generate individual modulation commands for the respective converter cells; and a gate signal generation unit which generates drive signals for the semiconductor switching elements on the basis of the arm modulation commands and the individual modulation commands.

Effect of the Invention

With the power conversion device according to the present disclosure, voltages of DC capacitors of all converter cells are kept within a certain range and the DC capacitor voltages of the converter cells are averaged, whereby overvoltage of each converter cell can be prevented.

DESCRIPTION OF EMBODIMENTS

Hereinafter, a power conversion device according to embodiments of the present disclosure will be described with reference to the drawings.

Embodiment 1

[Entire Configuration of Power Conversion Device]

Figure 1:
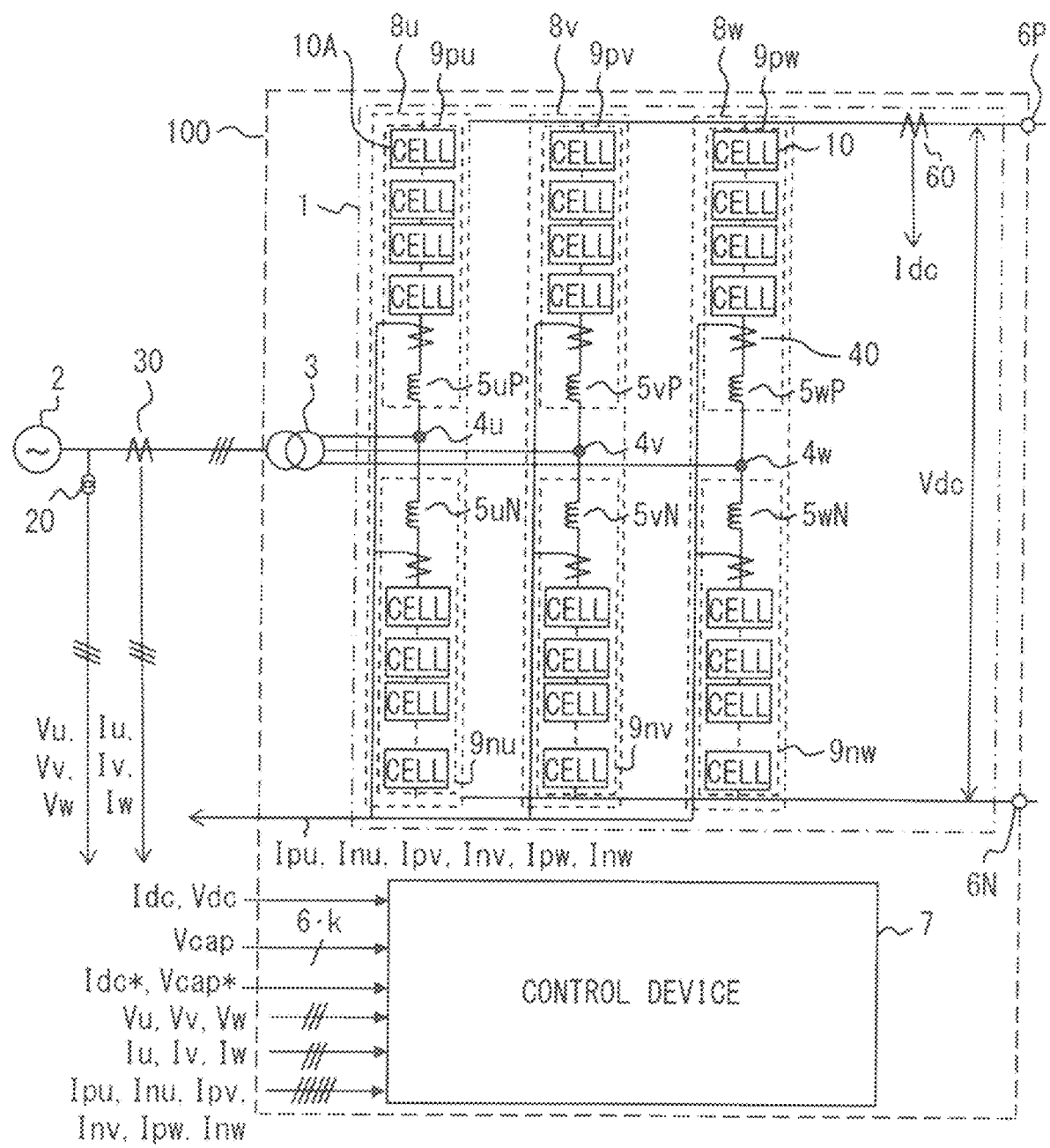
FIG. 1 is a schematic configuration diagram showing a power conversion system including a power conversion device according to embodiments of the present disclosure.

FIG. 1 is a block diagram showing the schematic configuration of a power conversion system including a power conversion device according to embodiment 1.

As shown in FIG. 1, a power conversion device 100 includes a power converter 1 and a control device 7.

The power converter 1 performs power conversion between AC and DC mutually, the AC side thereof is connected to an AC grid (AC circuit) 2 as plural-phase AC (e.g., three-phase AC) via a transformer 3, and the DC side thereof is connected to a DC grid (DC circuit) (not shown) via a positive DC terminal 6P and a negative DC terminal 6N.

The power converter 1 includes three leg circuits 8u, 8v, 8w provided respectively for U phase, V phase, and W phase of the three-phase AC as the plural-phase AC and connected in parallel between the positive DC terminal 6P and the negative DC terminal 6N.

The leg circuit 8u has a positive arm 9pu and a negative arm 9nu as a pair of arms, and the positive arm 9pu and the negative arm 9nu are connected in series to each other.

One end of the positive arm 9pu is connected to the positive DC terminal 6P, and one end of the negative arm 9nu is connected to the negative DC terminal 6N. A connection point 4u between the positive arm 9pu and the negative arm 9nu is connected to a U-phase terminal of the transformer 3.

The leg circuit 8v has a positive arm 9pv and a negative arm 9nv as a pair of arms, and the positive arm 9pv and the negative arm 9nv are connected in series to each other.

One end of the positive arm 9pv is connected to the positive DC terminal 6P, and one end of the negative arm 9nv is connected to the negative DC terminal 6N. A connection point 4v between the positive arm 9pv and the negative arm 9nv is connected to a V-phase terminal of the transformer 3.

The leg circuit 8w has a positive arm 9pw and a negative arm 9nw as a pair of arms, and the positive arm 9pw and the negative arm 9nw are connected in series to each other.

One end of the positive arm 9pw is connected to the positive DC terminal 6P, and one end of the negative arm 9nw is connected to the negative DC terminal 6N. A connection point 4w between the positive arm 9pw and the negative arm 9nw is connected to a W-phase terminal of the transformer 3.

Next, the configurations of the leg circuits 8u, 8v, 8w will be described.

The leg circuits 8v, 8w for V phase and W phase have the same configuration as the leg circuit 8u for U phase, and therefore description will be given using the leg circuit 8u for U phase.

The positive arm 9pu of the leg circuit 8u includes a plurality of converter cells 10 connected in series and a reactor 5uP, and the plurality of converter cells 10 and the reactor 5uP are connected in series to each other.

Similarly, the negative arm 9nu of the leg circuit 8u includes a plurality of converter cells 10 connected in series and a reactor 5uN, and the converter cells 10 and the reactor 5uN are connected in series to each other.

The reactor 5uP may be provided at any position in the positive arm 9pu, and also, the reactor 5uN may be provided at any position in the negative arm 9nu. The inductance values of the reactors 5uP, 5uN may be different from each other, and the reactors 5uP, 5uN may be coupled with reactors for another phase. A configuration in which the reactor 5uP is provided only in the positive arm 9pu may be adopted, or a configuration in which the reactor 5uN is provided only in the negative arm 9nu may be adopted. Each arm reactor is interposed so as to reduce circulation current circulating in the converter, and only has to be connected in series to the converter cell 10. A plurality of arm reactors may be interposed in a distributed manner.

In the following description, when the leg circuits 8u, 8v, 8w need not be discriminated from each other, they are referred to as leg circuits 8. In addition, when the positive arms 9pu, 9pv, 9pw and the negative arms 9nu, 9nv, 9nw need not be discriminated from each other, they are referred to as arms 9 or as positive arms 9P and negative arms 9N.

[Configuration of Converter Cell]

Next, the configuration of the converter cell 10 composing each leg circuit 8 will be described.

Figure 2:
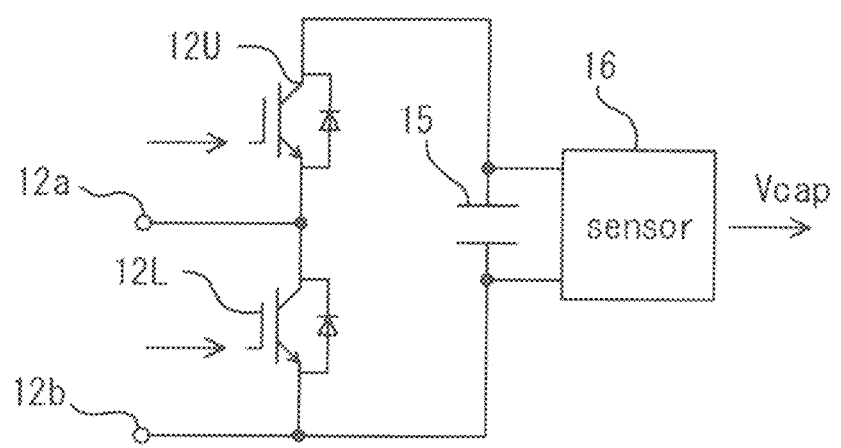
FIG. 2 is a circuit diagram showing an example of the configuration of a converter cell of a power conversion device according to embodiment 1.

FIG. 2 is a circuit diagram showing an example of the configuration of the converter cell 10 according to embodiment 1.

Figure 3:
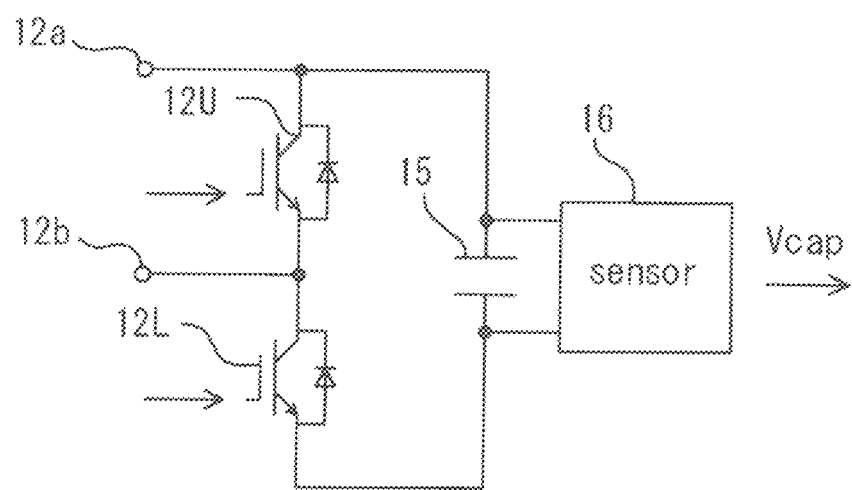
FIG. 3 is a circuit diagram showing another example of the configuration of a converter cell of the power conversion device according to embodiment 1.

FIG. 3 is a circuit diagram showing a configuration example of the converter cell 10 according to embodiment 1, which is different from FIG. 2.

Figure 4:
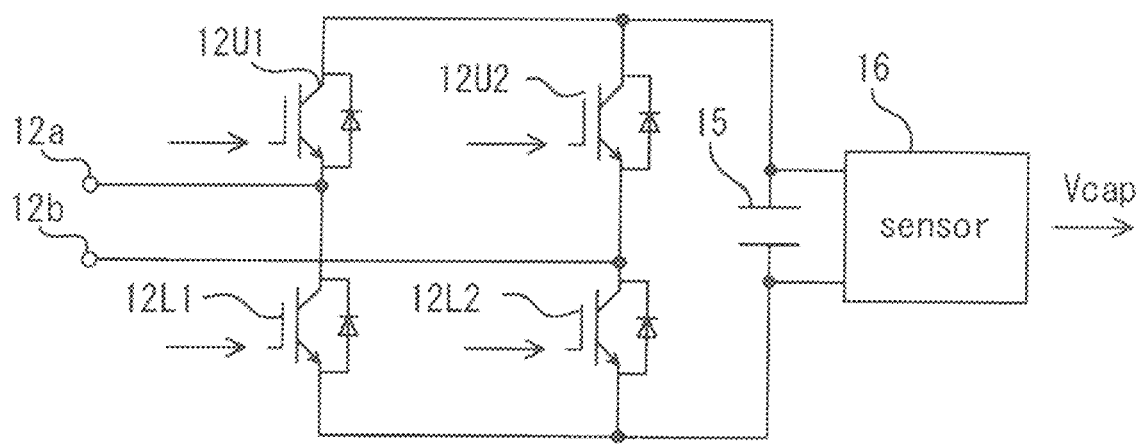
FIG. 4 is a circuit diagram showing another example of the configuration of a converter cell of the power conversion device according to embodiment 1.

FIG. 4 is a circuit diagram showing a configuration example of the converter cell 10 according to embodiment 1, which is different from FIG. 2 and FIG. 3.

As the converter cell 10, any of the circuit configurations shown in FIG. 2 to FIG. 4 may be used, and the circuit configurations may be combined in the positive arm 9P and the negative arm 9N.

The converter cell 10 shown in FIG. 2 includes a series unit of semiconductor switching elements 12U, 12L connected in series to each other, a DC capacitor 15 as an energy storage element connected in parallel to the series unit, and a voltage sensor 16 for detecting a voltage value Vcap of the DC capacitor 15. A connection point between the semiconductor switching elements 12U and 12L is connected to an input/output terminal 12a on the positive side, and a connection point between the semiconductor switching element 12L and the DC capacitor 15 is connected to an input/output terminal 12b on the negative side.

In the converter cell 10 having the configuration shown in FIG. 2, the semiconductor switching elements 12U, 12L are controlled such that one of them is turned on and the other is turned off. When the semiconductor switching element 12U is ON and the semiconductor switching element 12L is OFF, voltage across the DC capacitor 15 is applied between the input/output terminals 12a and 12b. Positive-side voltage is applied on the input/output terminal 12a side and negative-side voltage is applied on the input/output terminal 12b side.

The converter cell 10 shown in FIG. 3 includes a series unit of semiconductor switching elements 12U, 12L connected in series to each other, a DC capacitor 15 as an energy storage element connected in parallel to the series unit, and a voltage sensor 16 for detecting a voltage value Vcap of the DC capacitor 15. A connection point between the semiconductor switching elements 12U and 12L is connected to an input/output terminal 12b on the negative side, and a connection point between the semiconductor switching element 12U and the DC capacitor 15 is connected to an input/output terminal 12a on the positive side.

In the converter cell 10 having the configuration shown in FIG. 3, the semiconductor switching elements 12U, 12L are controlled such that one of them is turned on and the other is turned off. When the semiconductor switching element 12U is OFF and the semiconductor switching element 12L is ON, voltage across the DC capacitor 15 is applied between the input/output terminals 12a and 12b. Positive-side voltage is applied on the input/output terminal 12a side, and negative-side voltage is applied on the input/output terminal 12b side.

The converter cell 10 having the configuration shown in FIG. 4 includes a series unit of semiconductor switching elements 12U1, 12L1 connected in series to each other, a series unit of semiconductor switching elements 12U2, 12L2 which are also connected in series to each other, a DC capacitor 15 as an energy storage element, and a voltage sensor 16 for detecting a voltage value Vcap of the DC capacitor 15. The series unit of the semiconductor switching elements 12U1, 12L1, the series unit of the semiconductor switching elements 12U2, 12L2, and the DC capacitor 15 are connected in parallel to each other.

In the converter cell 10 having the configuration shown in FIG. 4, the semiconductor switching elements 12U1, 12L1 are controlled such that one of them is turned on and the other is turned off. Similarly, the semiconductor switching elements 12U2, 12L2 are controlled such that one of them is turned on and the other is turned off. When the semiconductor switching element 12U1 is ON and the semiconductor switching element 12L1 is OFF and when the semiconductor switching element 12U2 is OFF and the semiconductor switching element 12L2 is ON, voltage across the DC capacitor 15 is applied between the input/output terminals 12a and 12b. Positive-side voltage is applied on the input/output terminal 12a side, and negative-side voltage is applied on the input/output terminal 12b side.

When the semiconductor switching elements 12U, 12L, 12U1, 12L1, 12U2, 12L2 are collectively mentioned, they are referred to as semiconductor switching elements 12.

[Detectors of Power Conversion Device]

Next, detectors for detecting voltages and currents of the power conversion device 100 will be described.

The power conversion device 100 includes a plurality of detectors for detecting voltages and currents of the power conversion device 100, in addition to the voltage sensor 16 for detecting the voltage value Vcap (hereinafter, referred to as DC capacitor voltage value Vcap) of the DC capacitor 15.

That is, as shown in FIG. 1, current sensors 40 are provided for detecting arm currents Ipu, Inu, Ipv, Inv, Ipw, Inw flowing through the respective arms 9pu, 9nu, 9pv, 9pn, 9pw, 9nw of the leg circuits 8u, 8v, 8w. In addition, a voltage sensor 20 is provided for detecting AC voltages Vu, Vv, Vw of the AC grid 2, a current sensor 30 is provided for detecting AC currents Iu, Iv, Iw of the AC grid 2, a voltage sensor (not shown) is provided for detecting DC voltage Vdc between the positive DC terminal 6P and the negative DC terminal 6N, and a current sensor 60 is provided for detecting DC current Idc flowing through the positive DC terminal 6P or the negative DC terminal 6N.

[Control Device for Power Converter]

The control device 7 receives detection values measured by the plurality of detectors. That is, the control device 7 receives the DC capacitor voltage values Vcap of all the converter cells 10, the arm currents Ipu, Inu, Ipv, Inv, Ipw, Inw flowing through the respective arms 9pu, 9nu, 9pv, 9pn, 9pw, 9nw, the AC voltages Vu, Vv, Vw of the AC grid 2, the AC currents Iu, Iv, Iw of the AC grid 2, and the DC current Idc and the DC voltage Vdc between the positive DC terminal 6P and the negative DC terminal 6N.

Further, the control device 7 receives a DC voltage command Vdc* for the DC voltage between the positive DC terminal 6P and the negative DC terminal 6N, and an overall voltage command value Vcap* which is a command value for the DC capacitor voltages of all the converter cells 10. The DC voltage command Vdc* and the overall voltage command value Vcap* may be inputted from outside or may be set or generated in the control device 7.

Figure 5:
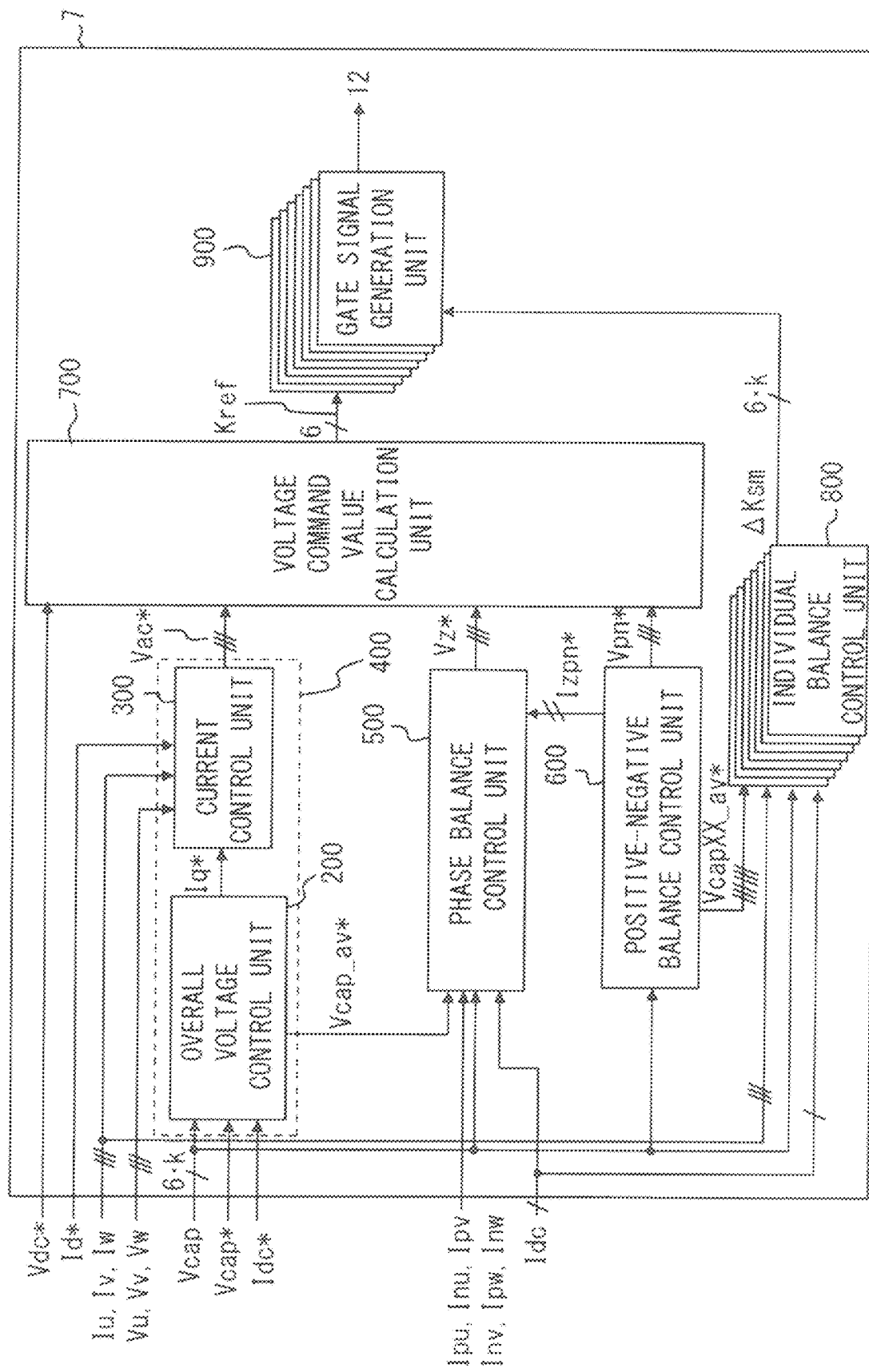
FIG. 5 is a block diagram showing a control device of the power conversion device according to embodiment 1.

FIG. 5 is a block diagram showing the control device for the power converter according to embodiment 1.

The control device 7 includes a first voltage control unit 400 including an overall voltage control unit 200 and a current control unit 300, a phase balance control unit 500, a positive-negative balance control unit 600, a voltage command value calculation unit 700, an individual balance control unit 800, and a gate signal generation unit 900.

The first voltage control unit 400 performs control so that a first representative value Vcap_av which is an average-value corresponding value of the DC capacitor voltages of all the converter cells 10 follows the predetermined overall voltage command value Vcap*, thus generating first voltage command values Vac*.

The phase balance control unit 500 performs control so that second representative values Vcapu, Vcapv, Vcapw which are average-value corresponding values of the DC capacitor voltages of the converter cells 10 in the leg circuits 8 for the respective phases follow the first representative value Vcap_av, thus generating second voltage command values Vz*.

The positive-negative balance control unit 600 performs control so that a deviation of third representative values VcapXX_av which are average-value corresponding values of the DC capacitor voltages of the converter cells 10 in the positive arm and the negative arm of the leg circuit 8 for each phase, becomes zero between the positive arm and the negative arm of the leg circuit 8 for each phase, thus generating third voltage command values Vpn*.

The voltage command value calculation unit 700 generates arm modulation commands Kref on the basis of the first voltage command values Vac*, the second voltage command values Vz*, and the third voltage command values Vpn*.

The individual balance control unit 800 performs control so that the DC capacitor voltages Vcap of all the converter cells 10 follow the third representative values VcapXX_av, thus generating individual modulation commands ΔKsm.

The gate signal generation unit 900 generates gate signals for driving the semiconductor switching elements 12 on the basis of the arm modulation commands Kref and the individual modulation commands ΔKsm.

As described above, the first voltage control unit 400 includes the overall voltage control unit 200 and the current control unit 300.

The overall voltage control unit 200 generates an active current command value Iq* so that a difference between the first representative value Vcap_av and the overall voltage command value Vcap* becomes zero.

The current control unit 300 generates the first voltage command values Vac* so that active current Iq of the power converter 1 follows the active current command value Iq* and reactive current Id of the power converter 1 follows a reactive current command value Id*.

Figure 14:
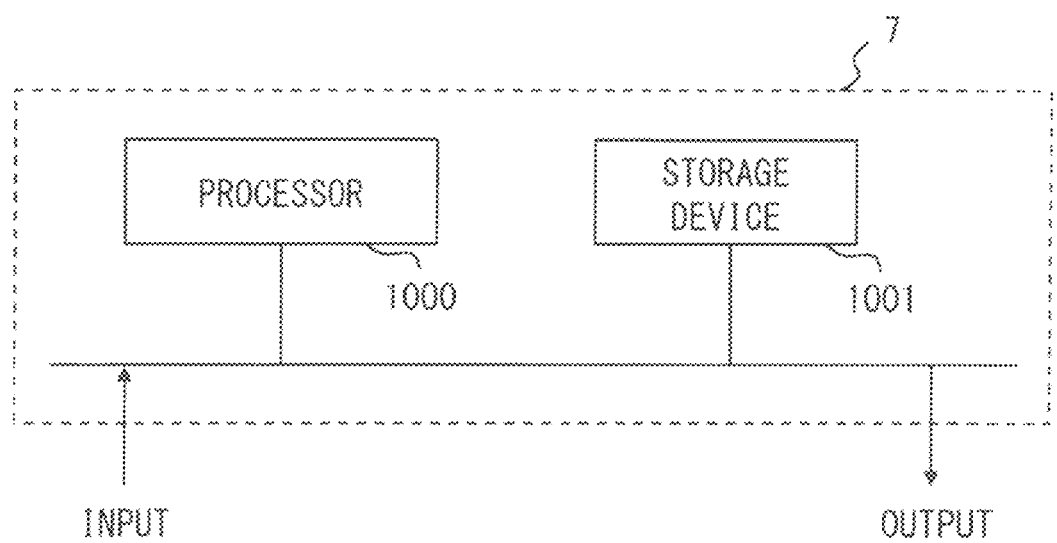
FIG. 14 is a block diagram showing a hardware configuration example of the control device of the power conversion device according to each embodiment.

The control device 7 is composed of a processor 1000 and a storage device 1001, as shown in FIG. 14 which shows a hardware example thereof. Although not shown, the storage device is provided with a volatile storage device such as a random access memory and a nonvolatile auxiliary storage device such as a flash memory.

Instead of the flash memory, an auxiliary storage device of a hard disk may be provided. The processor 1000 executes a program inputted from the storage device 1001. In this case, the program is inputted from the auxiliary storage device to the processor 1000 via the volatile storage device. The processor 1000 may output data such as a calculation result to the volatile storage device of the storage device 1001, or may store such data into the auxiliary storage device via the volatile storage device.

The control device 7 may be formed by a dedicated circuit, or a part or the entirety thereof may be formed by a field programmable gate array (FPGA).

[Currents Flowing in Power Conversion Device]

Here, before describing operation of the control device 7 in embodiment 1, currents flowing in the power conversion device 100 will be described with reference to FIG. 6.

Figure 6:
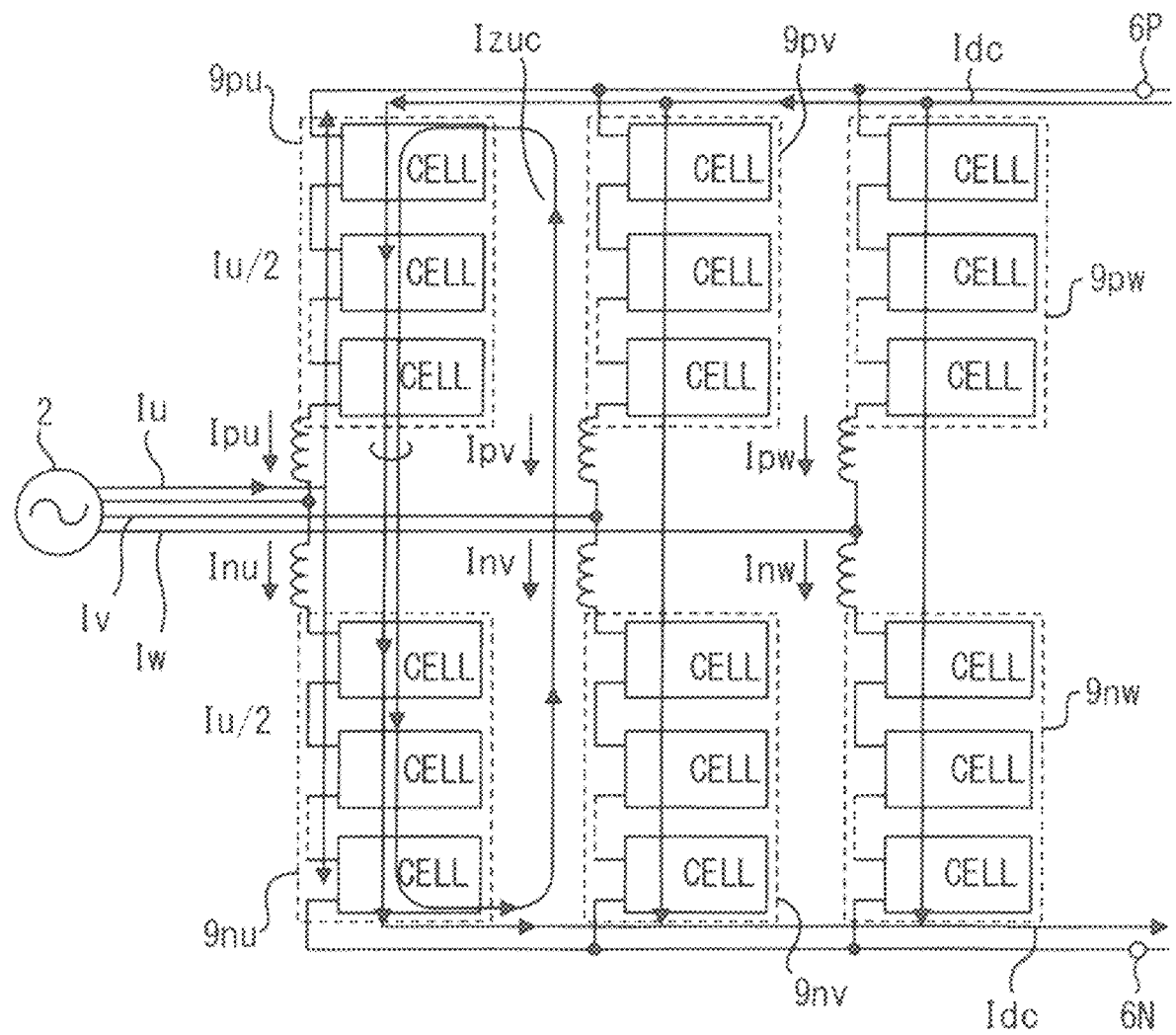
FIG. 6 illustrates currents flowing in the power conversion device according to embodiment 1.

In FIG. 6, respective currents are as follows.

Ipu, Ipv, Ipw: currents flowing through the U-phase positive arm 9pu, the V-phase positive arm 9pv, and the W-phase positive arm 9pw.

Inu, Inv, Inw: currents flowing through the U-phase negative arm 9nu, the V-phase negative arm 9nv, and the W-phase negative arm 9nw.

Iu: AC current for U phase flowing through the AC grid. Halves of the AC current Iu divisionally flow into the U-phase positive arm 9pu and the U-phase negative arm 9nu.

Iv: AC current for V phase flowing through the AC grid. Halves of the AC current Iv divisionally flow into the V-phase positive arm 9pv and the V-phase negative arm 9nv.

Iw: AC current for W phase flowing through the AC grid. Halves of the AC current Iw divisionally flow into the W-phase positive arm 9pw and the W-phase negative arm 9nw.

Idc: current flowing through the DC grid. One-third of Idc flows into each of the U-phase arm, the V-phase arm, and the W-phase arm.

Izu: a current component obtained by excluding current Iu/2 flowing through the AC power grid from the currents Ipu, Inu flowing through the U-phase arm. The following relationships are satisfied.

$$Izu = Ipu + Iu/2 \quad (1)$$

$$Izu = Inu - Iu/2 \quad (2)$$

Izuc: a circulation current component circulating among the leg circuits 8u, 8v, 8w without flowing through the AC grid and the DC grid. When the current Iu is eliminated from the above Expressions (1) and (2), the current component Izu is represented by the following Expression (3).

$$Izu = (Ipu + Inu)/2 \quad (3)$$

Thus, the circulation current component Izuc is represented by the following Expression (4).

$$Izuc = Izu - Idc/3 \quad (4)$$

Similarly, although not shown,

Izv: a current component obtained by excluding current Iv/2 flowing through the AC power grid from the currents Ipv, Inv flowing through the V-phase arm.

Izw: a current component obtained by excluding current Iw/2 flowing through the AC power grid from the currents Ipw, Inw flowing through the W-phase arm.

Then, circulation current components Izvc, Izwc are represented by the following Expressions (5) and (6).

$$Izvc = Izv - Idc/3 \quad (5)$$

$$Izwc = Izw - Idc/3 \quad (6)$$

[Outline of Control for Power Converter]

Next, the outline of control for the power converter 1 will be described.

In the power converter 1, temporal change of the DC capacitor voltage of each converter cell 10 is a value obtained by dividing AC instantaneous power by the DC capacitor voltage and thus depends on the AC current. Therefore, oscillation with the same frequency as a grid frequency of the AC grid occurs.

In each arm voltage, oscillation with a frequency that is two times the grid frequency of the AC grid occurs due to power pulsation of (AC voltage)×(AC current).

Therefore, in the power converter 1, it is important to balance the DC capacitor voltages of the converter cells 10 within a certain range so that the voltage of each converter cell 10 does not become overvoltage.

In control for the DC capacitor voltages in the power converter 1 of embodiment 1, control regarding the following four voltage components is performed.

The first voltage control unit 400 performs control regarding the first representative value which is an average-value corresponding value of the DC capacitor voltages of all the converter cells 10.

The phase balance control unit 500 performs control regarding the second representative value which is an average-value corresponding value of the DC capacitor voltages of the converter cells 10 in the leg circuit 8 for each phase.

The positive-negative balance control unit 600 performs control regarding the third representative values which are average-value corresponding values of the DC capacitor voltages of the converter cells 10 in the positive arm and the negative arm of the leg circuit 8 for each phase.

The individual balance control unit 800 performs control for individual DC capacitor voltages of the respective converter cells 10.

[Variation of DC Capacitor Voltage]

Here, variation of the DC capacitor voltage will be described in more detail.

In the power converter 1, the DC voltage Vdc and the DC current Idc have the same polarities between the positive arm and the negative arm, and have the same polarities among the phases.

In a case where AC voltages and AC currents inputted/outputted to/from the power converter 1 are in a three-phase balanced state, the AC voltages and the AC currents have opposite polarities between the positive arm and the negative arm, and are shifted from each other by 120 degrees among the phases.

That is, oscillations of the DC capacitor voltages with the same frequency as the grid frequency have opposite polarities between the positive arm and the negative arm, and are shifted from each other by 120 degrees among the phases. Oscillations of the DC capacitor voltages with a frequency that is two times the grid frequency have the same polarities between the positive arm and the negative arm, and are shifted from each other by 120 degrees among the phases.

Therefore, in the average of the DC capacitor voltages in only the arm on the one side for one of the plurality of phases, there are both of oscillation with the same frequency as the grid frequency and oscillation with a frequency that is two times the grid frequency.

In the average voltage of the DC capacitors in the leg circuit for each phase, oscillations with the same frequency as the grid frequency are canceled out between the positive arm and the negative arm, so that there is only oscillation of a frequency component that is two times the grid frequency.

In the average of the DC capacitor voltages of all the converter cells, oscillations with the same frequency as the grid frequency and oscillations with a frequency that is two times the grid frequency are both cancelled out between the arms and among the phases, so that there are no oscillation components.

[Details of Control for Power Converter]

Hereinafter, the detailed operation of the control device 7 for the power converter 1 will be described.

[Overall Voltage Control Unit]

Figure 7:
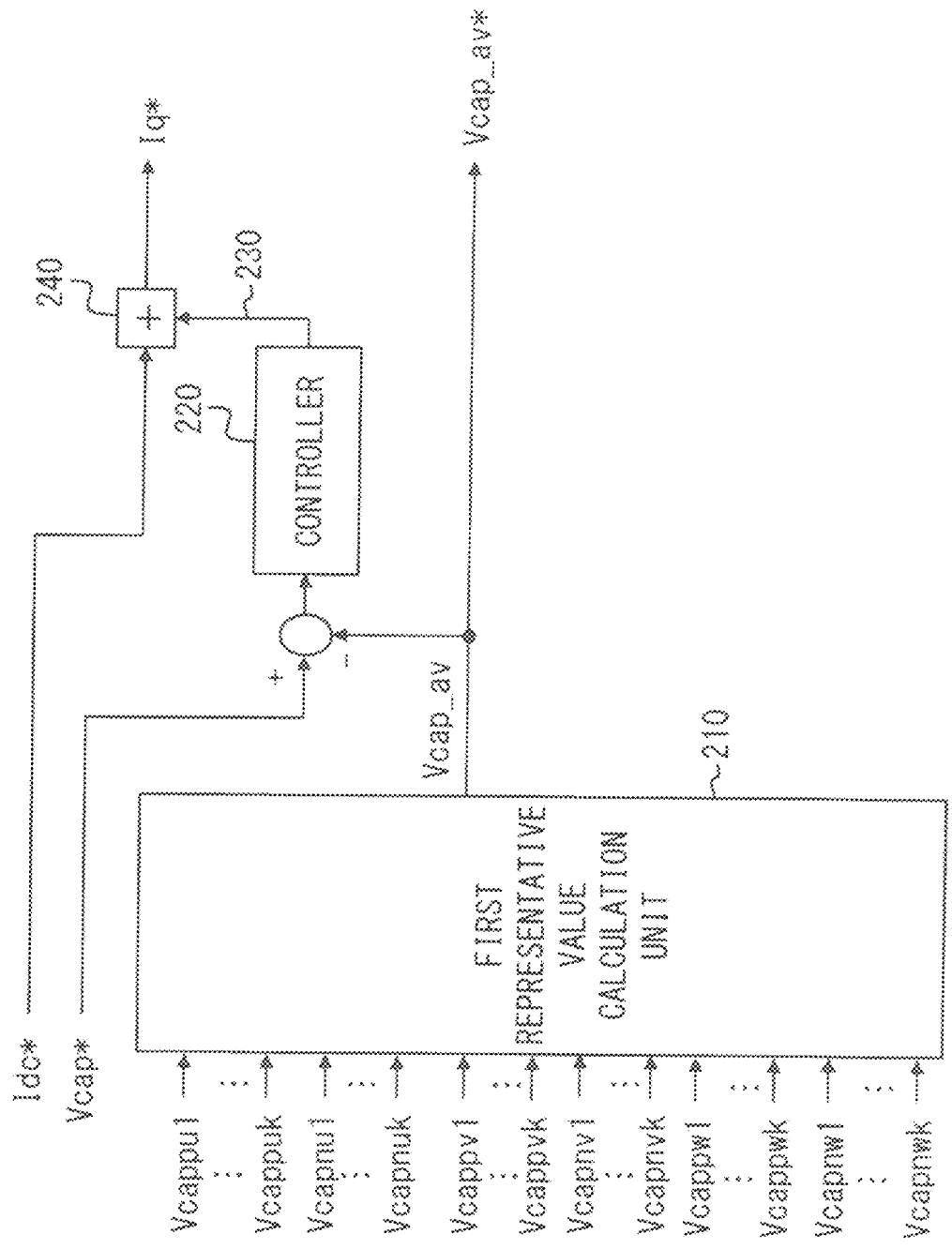
FIG. 7 is a block diagram showing an overall voltage control unit of the power conversion device according to embodiment 1.

FIG. 7 shows a control block diagram of the overall voltage control unit 200 in embodiment 1.

The overall voltage control unit 200 receives the DC capacitor voltages Vcap of all the converter cells 10 (in all arms for all phases), the DC capacitor voltage command value Vcap* (hereinafter, referred to as overall voltage command value Vcap*) for all the converter cells 10, and the DC current command value Idc*.

When the DC capacitor voltage values of all the converter cells 10 are described as a representative, they are referred to as Vcap, as shown in FIG. 5, for example. When they are described individually, for example, as shown in FIG. 7, the DC capacitor voltages in the U-phase positive arm are referred to as Vcappu1, ..., Vcappuk, the DC capacitor voltages in the U-phase negative arm are referred to as Vcapnu1, ..., Vcapnuk, the DC capacitor voltages in the V-phase positive arm are referred to as Vcappv1, ..., Vcappvk, the DC capacitor voltages in the V-phase negative arm are referred to as Vcapnv1, ..., Vcapnvk, the DC capacitor voltages in the W-phase positive arm are referred to as Vcappw1, ..., Vcappwk, and the DC capacitor voltages in the U-phase negative arm are referred to as Vcapnw1, ..., Vcapnwk.

In FIG. 7, a first representative value calculation unit 210 of the overall voltage control unit 200 calculates the average-value corresponding value Vcap_av of the DC capacitor voltages Vcap of all the converter cells 10. Here, the average-value corresponding value Vcap_av may be the average value obtained by dividing the sum of the DC capacitor voltages Vcap of all the converter cells 10 by the number of all the converter cells 10 or the median value of the DC capacitor voltages Vcap of all the converter cells 10. The average-value corresponding value Vcap_av calculated in the first representative value calculation unit 210 is referred to as the first representative value Vcap_av in the present disclosure.

Then, the overall voltage control unit 200 performs control so that the average-value corresponding value Vcap_av of the DC capacitor voltages Vcap of all the converter cells 10 follows the predetermined overall voltage command value Vcap*. As the average-value corresponding value Vcap_av of the DC capacitor voltages Vcap of all the converter cells, a filtered value thereof may be used in order to suppress sharp change.

Since a difference between AC power and DC power in the power converter 1 is common active power among all the converter cells 10, the DC capacitor voltages of all the converter cells 10 are controlled with active current Iq. That is, feedback control is performed by a controller 220 such as a proportional integral (PI) controller so that a difference between the average-value corresponding value Vcap_av of the DC capacitor voltages Vcap of all the converter cells 10 and the overall voltage command value Vcap* becomes 0. Then, to a control quantity 230 having undergone feedback, the DC current command value Idc* or a value obtained by filtering the DC current detection value Idc detected by the current sensor 60 is added by an adder 240, and the resultant control quantity after the addition is outputted as the active current command value Iq*.

Then, the overall voltage control unit 200 outputs the active current command value Iq* to the current control unit 300, and outputs the average-value corresponding value Vcap_av calculated by the first representative value calculation unit 210, as the first representative value Vcap_av*, to the phase balance control unit 500.

[Current Control Unit]

Next, the configuration and operation of the current control unit 300 in embodiment 1 will be described.

As shown in FIG. 5, the current control unit 300 receives the AC voltages Vu, Vv, Vw detected by the voltage sensor 20, the AC currents Iu, Iv, Iw detected by the current sensor 30, the active current command value Iq* outputted from the overall voltage control unit 200, and the reactive current command value Id* determined from the operation condition of the power conversion device 100.

Figure 8:
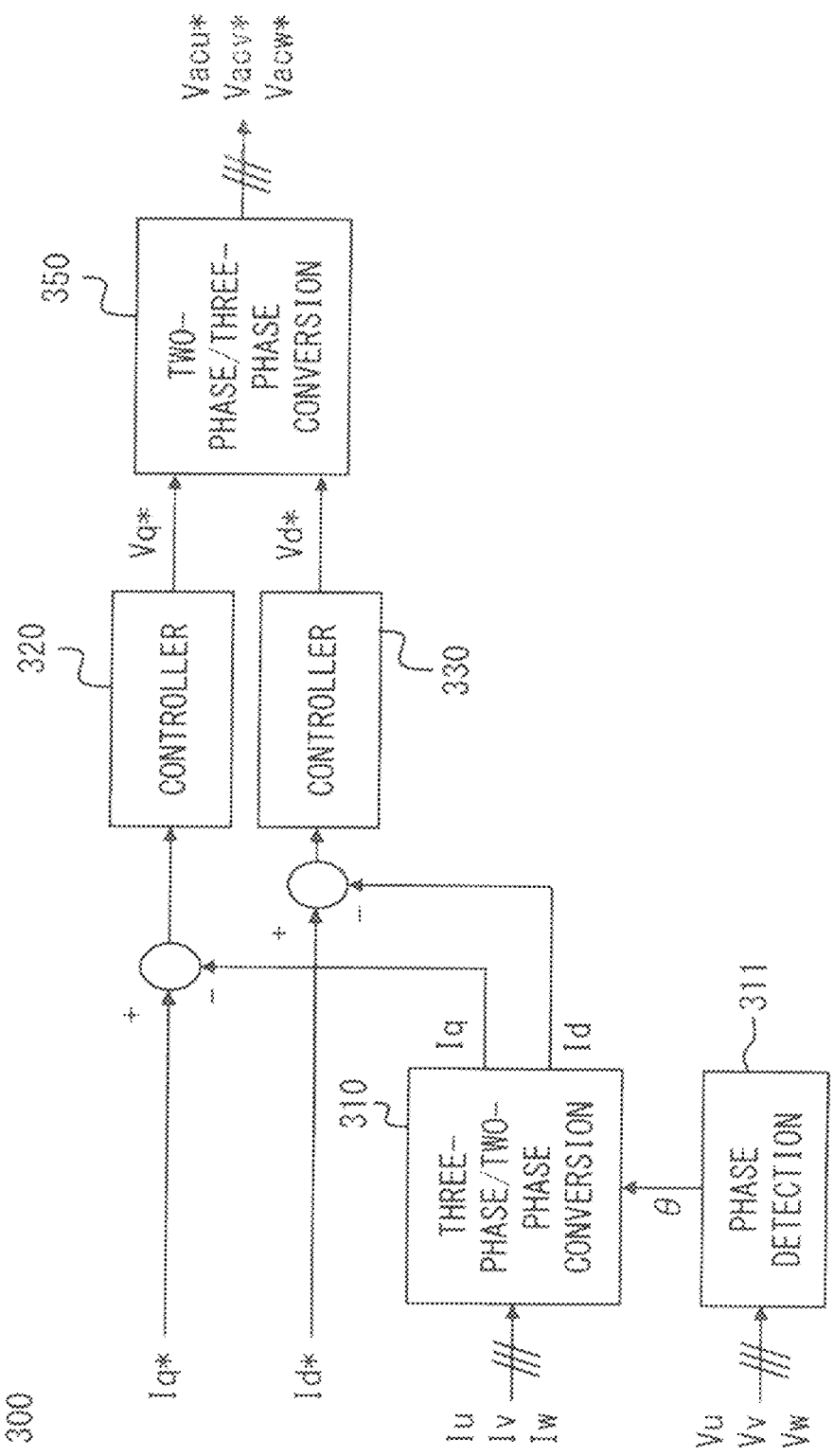
FIG. 8 is a block diagram showing a current control unit of the power conversion device according to embodiment 1.

FIG. 8 shows a control block diagram of the current control unit 300 in embodiment 1.

In the current control unit 300, the active current Iq and the reactive current Id of all the converter cells 10 in the power converter 1 are controlled, thereby performing power control of the power converter 1.

The active current Iq and the reactive current Id are calculated by performing three-phase/two-phase conversion on the basis of the AC currents Iu, Iv, Iw and a phase θ synchronized with the AC voltages Vu, Vv, Vw, as shown by the following Expression (7).

[Mathematical 1]

$$\begin{pmatrix} Id \\ Iq \end{pmatrix} = \frac{2}{3} \begin{pmatrix} \cos(\theta) & \cos(\theta - 2\pi/3) & \cos(\theta - 4\pi/3) \\ -\sin(\theta) & -\sin(\theta - 2\pi/3) & -\sin(\theta - 4\pi/3) \end{pmatrix} \begin{pmatrix} Iu \\ Iv \\ Iw \end{pmatrix} \quad (7)$$

That is, in FIG. 8, a phase detector 311 having received the AC voltages Vu, Vv, Vw detects the phase θ of the AC voltages Vu, Vv, Vw. Then, a three-phase/two-phase converter 310 receives the AC currents Iu, Iv, Iw and the phase θ of the AC voltages Vu, Vv, Vw outputted from the phase detector 311, and calculates the active current Iq and the reactive current Id on the basis of the above Expression (7).

Next, feedback control is performed by controllers 320 and 330 such as PI controllers so that the active current Iq and the reactive current Id respectively follow the active current command value Iq* and the reactive current command value Id*, thereby calculating voltage command values Vd*, Vq* on d and q axes.

Next, a two-phase/three-phase converter 350 receives the voltage command values Vd*, Vq* on d and q axes, and outputs AC voltage command values Vacu*, Vacv*, Vacw* for the respective phases (U phase, V phase, W phase), using the following Expression (8). When the AC voltage command values Vacu*, Vacv*, Vacw* are collectively mentioned, they are referred to as AC voltage command values Vac*.

[Mathematical 2]

$$\begin{pmatrix} Vacu* \\ Vacv* \\ Vacw* \end{pmatrix} = \begin{pmatrix} -1 & 0 \\ 1/2 & -\sqrt{3}/2 \\ 1/2 & \sqrt{3}/2 \end{pmatrix} \begin{pmatrix} \cos(\theta) & -\sin(\theta) \\ \sin(\theta) & \cos(\theta) \end{pmatrix} \begin{pmatrix} Vd* \\ Vq* \end{pmatrix} \quad (8)$$

Then, the current control unit 300 outputs the AC voltage command values Vac* (Vacu*, Vacv*, Vacw*) to the voltage command value calculation unit 700 at a subsequent stage.

Here, the AC voltage command values Vac* (Vacu*, Vacv*, Vacw*) are referred to as the first voltage command values in the present disclosure.

[Phase Balance Control Unit]

Next, the configuration and operation of the phase balance control unit 500 in embodiment 1 will be described.

As shown in FIG. 5, the phase balance control unit 500 receives the DC capacitor voltages Vcap of all the converter cells 10, the arm currents Ipu, Inu, Ipv, Inv, Ipw, Inw detected by the current sensors 40, the DC current Idc detected by the current sensor 60, the average-value corresponding value (first representative value) Vcap_av* of all the DC capacitor voltages outputted from the overall voltage control unit 200, and circulation current commands value Izpn* (Izpna*, Izpnb) for positive-negative balance outputted from the positive-negative balance control unit 600 described later.

Figure 9:
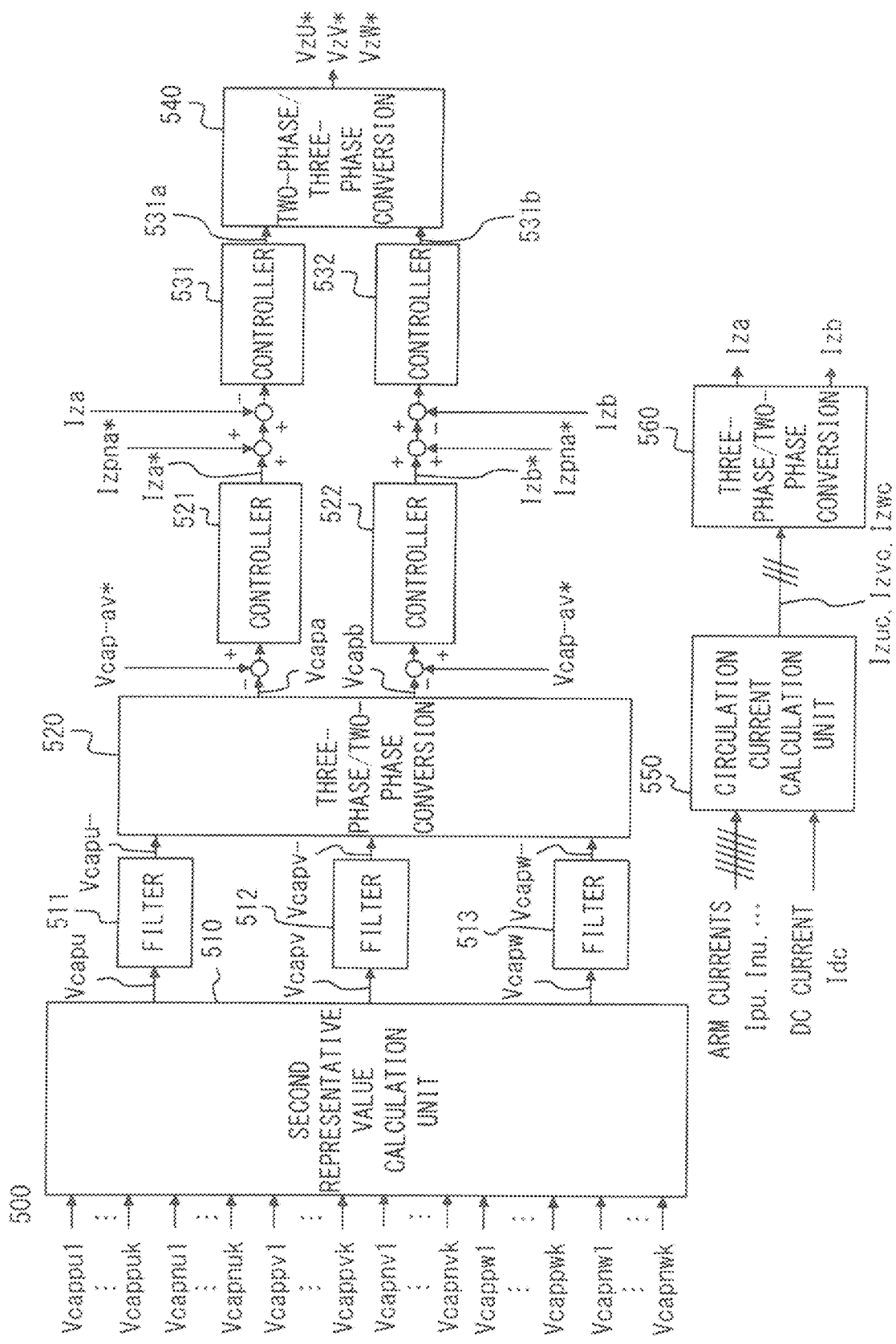
FIG. 9 is a block diagram showing a phase balance control unit of the power conversion device according to embodiment 1.

FIG. 9 shows a control block diagram of the phase balance control unit 500 in embodiment 1.

The phase balance control unit 500 performs control so that the average-value corresponding values (second representative values) Vcapu, Vcapv, Vcapw of the DC capacitor voltages for the respective phases (U phase, V phase, W phase) follow the average-value corresponding value (first representative value) Vcap_av* of all the DC capacitor voltages outputted from the overall voltage control unit 200.

A second representative value calculation unit 510 calculates the average-value corresponding values (second representative values) Vcapu, Vcapv, Vcapw of the DC capacitor voltages of all the converter cells 10 in the leg circuits 8u, 8v, 8w for the respective phases (U phase, V phase, W phase).

Each of the average-value corresponding values (second representative values) Vcapu, Vcapv, Vcapw of the DC capacitor voltages of the converter cells 10 for the respective phases may be the average value of the DC capacitor voltages Vcap for each phase, the median value of the DC capacitor voltages Vcap for each phase, or a representative value calculated from the maximum value and the minimum value of the DC capacitor voltages Vcap for each phase.

The average-value corresponding values (second representative values) Vcapu, Vcapv, Vcapw of the DC capacitor voltages for the respective phases oscillate with a frequency that is two times the grid frequency, and frequency components that are two times the grid frequency are removed from the second representative values Vcapu, Vcapv, Vcapw by filters 511, 512, 513. As the filters 511, 512, 513, moving average filters or notch filters for the frequency that is two times the grid frequency are applied, for example.

Next, values obtained through the filters 511, 512, 513 from the second representative values Vcapu, Vcapv, Vcapw are referred to as Vcapu-, Vcapv-, Vcapw-, and the values Vcapu-, Vcapv-, Vcapw- are subjected to three-phase/two-phase conversion by a three-phase/two-phase converter 520 on the basis of the following Expression (9), thus calculating control values Vcapa, Vcapb.

[Mathematical 3]

$$\begin{pmatrix} Vcapa \\ Vcapb \end{pmatrix} = \begin{pmatrix} 1 & -1/2 & -1/2 \\ 0 & \sqrt{3}/2 & -\sqrt{3}/2 \end{pmatrix} \begin{pmatrix} Vcapu- \\ Vcapv- \\ Vcapw- \end{pmatrix} \quad (9)$$

Next, using controllers 521, 522, for example, proportional integral (PI) control is performed so that a deviation between the average-value corresponding value (first representative value) Vcap_av* of all the capacitor voltages outputted from the overall voltage control unit 200 and each of the control values Vcapa, Vcapb becomes zero, thus calculating circulation current command values Iza*, Izb* for phase balance.

Next, the circulation current command values Iza*, Izb* for phase balance and the circulation current command values Izpna*, Izpnb* for positive-negative balance outputted from the positive-negative balance control unit 600 described later, are respectively added.

Then, using controllers 531, 532, for example, proportional integral (PI) control is performed so that deviations between control values Iza, Izb outputted from a three-phase/two-phase converter 560 described later and the values obtained by adding the circulation current command values Iza*, Izb* for phase balance and the circulation current command values Izpna*, Izpnb* for positive-negative balance, become zero, thus outputting output values 531a, 531b. Then, the output values 531a, 531b are converted by a two-phase/three-phase converter 540, to output voltage command values VzU*, VzV*, VzW* for circulation current. Here, when the voltage command values VzU*, VzV*, VzW* for circulation current are collectively mentioned, they are referred to as the voltage command values Vz*.

Meanwhile, a circulation current calculation unit 550 of the phase balance control unit 500 receives the arm currents Ipu, Inu, Ipv, Inv, Ipw, Inw and the DC current Idc, and calculates the circulation currents Izuc, Izvc, Izwc using the above Expressions (3) to (6). Then, the three-phase/two-phase converter 560 performs three-phase/two-phase conversion of the circulation currents Izuc, Izvc, Izwc on the basis of the following Expression (10), thus outputting the control values Iza, Izb.

[Mathematical 4]
$$\begin{pmatrix} Iza \\ Izb \end{pmatrix} = \begin{pmatrix} 1 & -1/2 & -1/2 \\ 0 & \sqrt{3}/2 & -\sqrt{3}/2 \end{pmatrix} \begin{pmatrix} Izuc \\ Izvc \\ Izwc \end{pmatrix} \quad (10)$$

As described above, the control values Iza, Izb outputted from the three-phase/two-phase converter 560 are subjected to, for example, PI control, using the controllers 531, 532, so that deviations between the control values Iza, Izb and the values obtained by adding the circulation current command values Iza*, Izb* for phase balance and the circulation current command values Izpna*, Izpnb* for positive-negative balance, become zero.

The phase balance control unit 500 outputs the voltage command values VzU*, VzV*, VzW* for circulation current from the two-phase/three-phase converter 540 to the voltage command value calculation unit 700 at a subsequent stage.

When the voltage command values VzU*, VzV*, VzW* are collectively mentioned, they are referred to as the voltage command values Vz* (see FIG. 5).

Also, the voltage command values Vz* (VzU*, VzV*, VzW*) are referred to as the second voltage command values in the present disclosure.

[Positive-Negative Balance Control Unit]

Next, the configuration and operation of the positive-negative balance control unit 600 in embodiment 1 will be described.

As shown in FIG. 5, the positive-negative balance control unit 600 receives the DC capacitor voltages Vcap of all the converter cells 10.

The positive-negative balance control unit 600 performs control so that the DC capacitor voltages in the positive arms and the DC capacitor voltages in the negative arm are balanced in each of the leg circuits $8u$, $8v$, $8w$ for the respective phases (U phase, V phase, W phase).

In order to eliminate imbalance of the DC capacitor voltages between the positive arm and the negative arm, the direction (current charging/discharging direction) of power flowing into the DC capacitors 15 needs to be reversed between the positive arm and the negative arm. Since the AC voltages inputted/outputted to/from the power converter 1 have opposite polarities between the positive arm and the negative arm, 1f-component AC currents having the same polarity are caused to flow in order to charge/discharge the DC capacitors between the positive arm and the negative arm.

Figure 10:
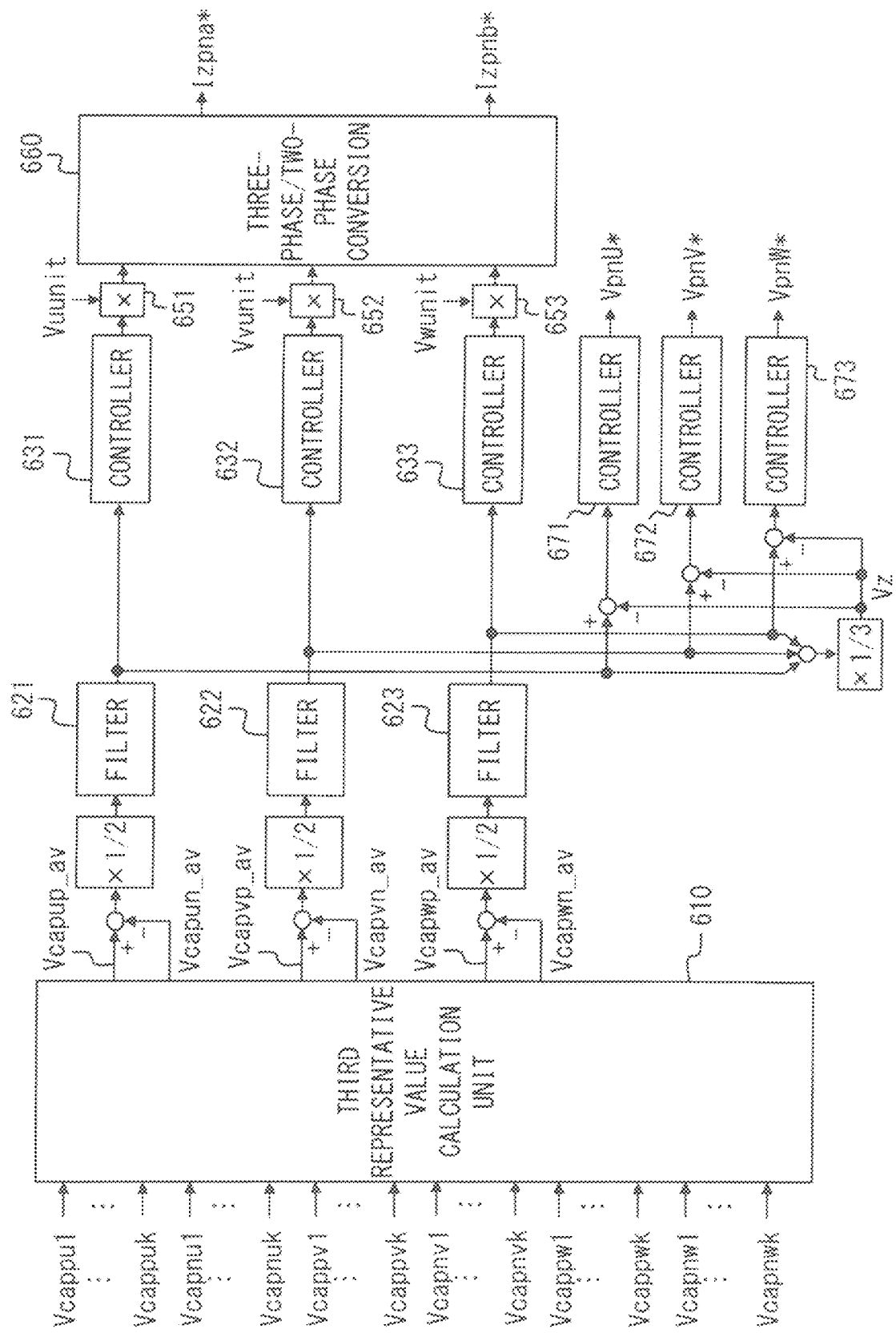
FIG. 10 is a block diagram showing a positive-negative balance control unit of the power conversion device according to embodiment 1.

FIG. 10 shows a control block diagram of the positive-negative balance control unit 600 in embodiment 1.

A third representative value calculation unit 610 receives the DC capacitor voltage values Vcap of all the converter cells 10 and calculates an average-value corresponding value (Vcapup_av, Vcapun_av, Vcapvp_av, Vcapvn_av, Vcapwp_av, Vcapwn_av) of the DC capacitor voltages of the converter cells 10 in each of the positive arm and the negative arm for each phase (U phase, V phase, W phase). Here, the average-value corresponding value may be the average value of the DC capacitor voltages in each of the positive arm and the negative arm for each phase, the median value of the DC capacitor voltages in each of the positive arm and the negative arm for each phase, or a representative value calculated from the maximum value and the minimum value of the DC capacitor voltages in each of the positive arm and the negative arm for each phase.

Then, control is performed so that, for each phase, a difference between the average-value corresponding value (Vcapup_av, Vcapvp_av, Vcapwp_av) of the DC capacitor voltages in the positive arm and the average-value corresponding value (Vcapun_av, Vcapvn_av, Vcapwn_av) of the DC capacitor voltages in the negative arm, becomes zero.

Specifically, as shown in FIG. 10, the values of the differences between the average-value corresponding values (Vcapup_av, Vcapvp_av, Vcapwp_av) of the DC capacitor voltages in the positive arm and the average-value corresponding values (Vcapun_av, Vcapvn_av, Vcapwn_av) of the DC capacitor voltages in the negative arm calculated by the third representative value calculation unit 610 are respectively multiplied by (½) at multipliers, and the multiplied values are filtered through filters 621, 622, 623.

In the calculated average-value corresponding value of the DC capacitor voltages in the arm on one side, there are oscillation with the same frequency as the grid frequency and oscillation with a frequency that is two times the grid frequency. Therefore, in the filters 621, 622, 623, the above values are filtered through moving average filters for the same frequency as the grid frequency, or through notch filters for the same frequency as the grid frequency and notch filters with a frequency that is two times the grid frequency.

Then, the values (referred to as positive-negative balance outputs for respective phases) obtained through the filters 621, 622, 623 are subjected to, for example, PI control by controllers 631, 632, 633, and the resultant values are outputted.

Here, in order to eliminate imbalance of the DC capacitor voltages between the positive arm and the negative arm, the direction (current charging/discharging direction) of power flowing into the DC capacitors needs to be reversed between the positive arm and the negative arm. Since the AC voltages inputted/outputted to/from the power converter 1 have opposite polarities between the positive arm and the negative arm, 1f-component (fundamental-component) AC currents having the same polarity need to be caused to flow in order to charge/discharge the DC capacitors between the positive arm and the negative arm.

That is, with respect to the output values of the controllers 631, 632, 633, magnitudes of AC currents needed for balancing the positive arm and the negative arm for each phase are outputted, and then are multiplied by unit sine waves (Vuunit, Vvunit, Vwunit) having a magnitude of 1 and the same phases as the AC voltages for the respective phases, at multipliers 651, 652, 653, thus calculating 1f-component (fundamental-component) AC currents. Then, these are subjected to three-phase/two-phase conversion by the three-phase/two-phase converter 660, thus outputting circulation current command values (Izpna*, Izpnb*) for positive-negative balance.

Meanwhile, controllers 671, 672, 673 output AC voltage commands VpnU*, VpnV*, VpnW*.

That is, the values (positive-negative balance outputs for respective phases) obtained through the filters 621, 622, 623 are added and then the resultant value is multiplied by (⅓) at a multiplier, thus calculating neutral point voltage Vz. Then, differences between the neutral point voltage Vz and the positive-negative balance outputs for respective phases are subjected to, for example, PI control by the controllers 671, 672, 673, thus outputting the AC voltage commands VpnU*, VpnV*, VpnW* for positive-negative balance. Here, when the AC voltage commands VpnU*, VpnV*, VpnW* are collectively mentioned, they are referred to as the AC voltage command values Vpn* (see FIG. 5).

The voltage command values Vpn* (VpnU*, VpnV*, VpnW*) are referred to as the third voltage command values in the present disclosure.

The positive-negative balance control unit 600 outputs the circulation current command values Izpn* (Izpna*, Izpnb*) as AC components for the respective phases, and the AC voltage command values Vpn* (VpnU*, VpnV*, VpnW*) as DC components for the respective phases.

[Voltage Command Value Calculation Unit]

The voltage command value calculation unit 700 receives the DC voltage command value Vdc*, the first voltage command values Vac* (Vacu*, Vacv*, Vacw*) outputted from the current control unit 300, the second voltage command values Vz* (VzU*, VzV*, VzW*) outputted from the phase balance control unit 500, and the third voltage command values Vpn* outputted from the positive-negative balance control unit 600, and calculates voltage command values Vref for the respective arms by the following Expression (11).

That is, voltage command values Vrefpu, Vrefpv, Vrefpw, Vrefnu, Vrefnv, and Vrefnw for the U-phase positive arm, the V-phase positive arm, the W-phase positive arm, the U-phase negative arm, the V-phase negative arm, and the W-phase negative arm are calculated by the following Expression (11).

$$Vrefpu = Vdc^* + VzU^* - Vacu^* - VpnU^*$$

$$Vrefpv = Vdc^* + VzV^* - Vacv^* - VpnV^*$$

$$Vrefpw = Vdc^* + VzW^* - Vacw^* - VpnW^*$$

$$Vrefnu = Vdc^* + VzU^* + Vacu^* + VpnU^*$$

$$Vrefnv = Vdc^* + VzV^* + Vacv^* + VpnV^*$$

$$Vrefnw = Vdc^* + VzW^* + Vacw^* + VpnW^* \quad \text{Expression (11)}$$

The voltage command values Vrefpu, Vrefpv, Vrefpw, Vrefnu, Vrefnv, and Vrefnw for the U-phase positive arm, the V-phase positive arm, the W-phase positive arm, the U-phase negative arm, the V-phase negative arm, and the W-phase negative arm calculated as described above, are each divided by a value corresponding to the voltage total value of the DC capacitors 15 included in the corresponding one of the U-phase positive arm, the V-phase positive arm, the W-phase positive arm, the U-phase negative arm, the V-phase negative arm, and the W-phase negative arm, thus generating arm modulation commands Krefpu, Krefpv, Krefpw, Krefnu, Krefnv, and Krefnw for the U-phase positive arm, the V-phase positive arm, the W-phase positive arm, the U-phase negative arm, the V-phase negative arm, and the W-phase negative arm.

The arm modulation commands Kref (Krefpu, Krefpv, Krefpw, Krefnu, Krefnv, Krefnw) which are calculation results of the voltage command value calculation unit 700 are outputted to the gate signal generation unit 900.

[Individual Balance Control Unit]

Next, the configuration and operation of the individual balance control unit 800 in embodiment 1 will be described.

As shown in FIG. 5, the individual balance control unit 800 receives the average-value corresponding values (third representative values) VcapXX_av (Vcappu_av, Vcapnu_av, Vcappv_av, Vcapnv_av, Vcappw_av, Vcapnw_av) of the DC capacitor voltages in the respective arms outputted from the third representative value calculation unit 610 of the positive-negative balance control unit 600, the DC capacitor voltages Vcap of all the converter cells 10, the AC currents Iu, Iv, Iw detected by the current sensor 30, and the DC current Idc detected by the current sensor 60, and performs control so that the DC capacitor voltage detection value Vcap of each converter cell 10 follows the DC capacitor voltage average-value corresponding value (third representative value) VcapXX_av* in the corresponding arm.

Figure 11:
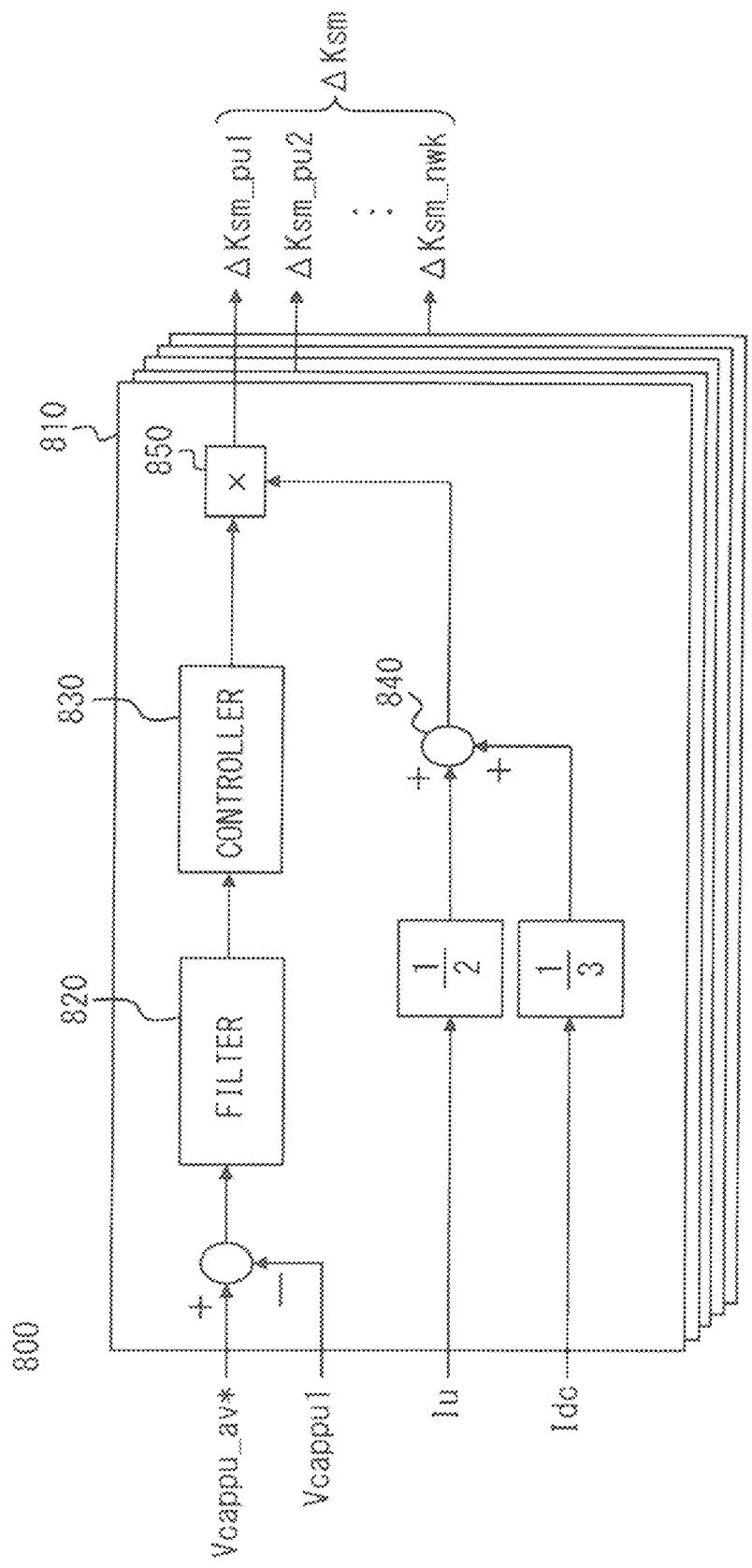
FIG. 11 is a block diagram showing an individual balance control unit of the power conversion device according to embodiment 1.

FIG. 11 shows a block diagram of the individual balance control unit 800, and in particular, is a block diagram showing a control unit 810 corresponding to one converter cell 10 in the individual balance control unit 800. Here, the control unit 810 shown in FIG. 11 corresponds to one converter cell 10A (see FIG. 1) in the U-phase positive arm.

The individual balance control unit 800 is composed of collection of control units 810 whose number is the same as the number of all the converter cells 10 and which one-by-one correspond to the respective converter cells 10.

With reference to FIG. 11, control in the individual balance control unit 800 will be described using one converter cell 10A in the U-phase positive arm as a representative example.

The individual balance control unit 800 uses active power for controlling the DC capacitor voltage of each converter cell 10. By changing the output voltage of each converter cell 10 in accordance with current flowing through each converter cell 10, active power of the converter cell 10 is changed, whereby it becomes possible to suppress variation of the DC capacitor voltage.

In each arm voltage and the DC capacitor voltage of each converter cell, there are an oscillation component with the same frequency as the grid frequency and an oscillation component with a frequency that is two times the grid frequency. Therefore, a deviation between the average-value corresponding value (third representative value) Vcappu_av* of the DC capacitor voltages in the U-phase positive arm and the DC capacitor voltage Vcappu1 of one converter cell 10 in the U-phase positive arm is filtered through a filter 820.

Then, a value obtained by filtering, through the filter 820, the voltage deviation between the average-value corresponding value (third representative value) Vcappu_av* of the DC capacitor voltages in the U-phase positive arm and the DC capacitor voltage Vcappu1 of the converter cell 10, is subjected to proportional control by a controller 830.

Further, the output value of the controller 830 is multiplied by the sum of DC current (⅓×Idc) and AC current (½×Iu) for each phase, at a multiplier 850, whereby a voltage component having the same phase as current of each converter cell 10 is calculated, thus generating an individual control voltage command ΔVsm_pu1. Then, the individual control voltage command ΔVsm_pu1 is divided by a value corresponding to the DC capacitor voltage Vcappu1, whereby an individual control modulation command ΔKsm_pu1 is generated.

As described above, in the individual balance control unit 800, with respect to the converter cells 10 in the U-phase positive arm 9pu, the average-value corresponding value Vcappu_av* of the DC capacitor voltages in the U-phase positive arm, the DC capacitor voltages Vcappu1, . . . , Vcappuk of the converter cells 10 in the U-phase positive arm, the AC current (½×Iu), and the DC current (⅓×Idc) are inputted, and individual control modulation commands ΔKsm_pu1, . . . , ΔKsm_puk are calculated and outputted.

In addition, with respect to the converter cells 10 in the U-phase negative arm 9*nu*, the average-value corresponding value Vcapnu_av* of the DC capacitor voltages in the U-phase negative arm, the DC capacitor voltages Vcapnu1, . . . , Vcapnuk of the converter cells 10 in the U-phase negative arm, the AC current (½×Iu), and the DC current (⅓Idc) are inputted, and individual control modulation commands ΔKsm_nu1, . . . , ΔKsm_nuk are calculated and outputted.

In addition, with respect to the converter cells 10 in the V-phase positive arm 9*pv*, the average-value corresponding value Vcappv_av* of the DC capacitor voltages in the V-phase positive arm, the DC capacitor voltages Vcappv1, . . . , Vcappvk of the converter cells 10 in the V-phase positive arm, the AC current (½×Iv), and the DC current (⅓×Idc) are inputted, and individual control modulation commands ΔKsm_pv1, . . . , ΔKsm_pvk are calculated and outputted.

In addition, with respect to the converter cells 10 in the V-phase negative arm 9*nv*, the average-value corresponding value Vcapnv_av* of the DC capacitor voltages in the V-phase negative arm, the DC capacitor voltages Vcapnv1, . . . , Vcapnvk of the converter cells 10 in the V-phase negative arm, the AC current (½×Iv), and the DC current (⅓×Idc) are inputted, and individual control modulation commands ΔKsm_nv1, . . . , ΔKsm_nvk are calculated and outputted.

In addition, with respect to the converter cells 10 in the W-phase positive arm 9*pw*, the average-value corresponding value Vcappw_av* of the DC capacitor voltages in the W-phase positive arm, the DC capacitor voltages Vcappw1, . . . , Vcappwk of the converter cells 10 in the W-phase positive arm, the AC current (½×Iw), and the DC current (⅓×Idc) are inputted, and individual control modulation commands ΔKsm_pw1, . . . , ΔKsm_pwk are calculated and outputted.

In addition, with respect to the converter cells 10 in the W-phase negative arm 9*nw*, the average-value corresponding value Vcapnw_av* of the DC capacitor voltages in the W-phase negative arm, the DC capacitor voltages Vcapnw1, . . . , Vcapnwk of the converter cells 10 in the W-phase negative arm, the AC current (½×Iw), and the DC current (⅓×Idc) are inputted, and individual control modulation commands ΔKsm_nw1, . . . , ΔKsm_nwk are calculated and outputted.

When the individual control modulation commands ΔKsm_pu1, . . . , ΔKsm_nwk are collectively mentioned, they are referred to as individual control modulation commands ΔKsm.

The individual control modulation commands ΔKsm (ΔKsm_pu1, . . . , ΔKsm_nwk) calculated by the individual balance control unit 800 are outputted to the gate signal generation unit 900.

[Gate Signal Generation Unit]

The gate signal generation unit 900 synthesizes the arm modulation commands Kref (Krefpu, Krefnu, Krefpv, Krefnv, Krefpw, Krefnw) outputted from the voltage command value calculation unit 700 and the individual control modulation commands ΔKsm (ΔKsm_nw1, . . . , ΔKsm_nwk) outputted from the individual balance control unit 800, to obtain modulation commands for the respective converter cells 10.

That is, with respect to the respective converter cells 10 in the U-phase positive arm 9*pu*, the arm modulation command Krefpu and each individual control modulation command ΔKsm_pu1, . . . , ΔKsm_puk are synthesized.

In addition, with respect to the respective converter cells 10 in the U-phase negative arm 9*nu*, the arm modulation command Krefnu and each individual control modulation command ΔKsm_nu1, . . . , ΔKsm_nuk are synthesized.

In addition, with respect to the respective converter cells 10 in the V-phase positive arm 9*pv*, the arm modulation command Krefpv and each individual control modulation command ΔKsm_pv1, . . . , ΔKsm_pvk are synthesized.

In addition, with respect to the respective converter cells 10 in the V-phase negative arm 9*nv*, the arm modulation command Krefnv and each individual control modulation command ΔKsm_nv1, . . . , ΔKsm_nvk are synthesized.

In addition, with respect to the respective converter cells 10 in the W-phase positive arm 9*pw*, the arm modulation command Krefpw and each individual control modulation command ΔKsm_pw1, . . . , ΔKsm_pwk are synthesized.

In addition, with respect to the respective converter cells 10 in the W-phase negative arm 9*nw*, the arm modulation command Krefnw and each individual control modulation command ΔKsm_nw1, . . . , ΔKsm_nwk are synthesized.

The gate signal generation unit 900 generates gate signals for performing pulse width modulation (PWM) control for the semiconductor switching elements 12 of the respective converter cells 10, on the basis of comparison between a carrier wave and the synthesized modulation command for each converter cell 10, for example.

Effects of Embodiment 1

As described above, according to embodiment 1, the control device includes a first voltage control unit which performs control so that a first representative value which is an average-value corresponding value of DC capacitor voltages of all the converter cells follows a predetermined overall voltage command value, to generate a first voltage command value, a phase balance control unit which performs control so that a second representative value which is an average-value corresponding value of the DC capacitor voltages of the converter cells in the leg circuit for each phase follows the first representative value, to generate a second voltage command value, a positive-negative balance control unit which performs control so that a deviation of third representative values which are average-value corresponding values of the DC capacitor voltages of the converter cells in the positive arm and the negative arm of the leg circuit for each phase becomes zero between the positive arm and the negative arm of the leg circuit for each phase, to generate a third voltage command value, a voltage command value calculation unit which generates an arm modulation command for each arm on the basis of the first voltage command value, the second voltage command value, and the third voltage command value, an individual balance control unit which performs control so that the DC capacitor voltages of all the converter cells follow the third representative values, to generate individual modulation commands for the respective converter cells, and a gate signal generation unit which generates drive signals for the semiconductor switching elements on the basis of the arm modulation commands and the individual modulation commands.

Thus, voltages of the DC capacitors of all the converter cells are kept within a certain range and the DC capacitor voltages of the converter cells are averaged, whereby overvoltage of each converter cell can be prevented.

In addition, the first voltage control unit includes
an overall voltage control unit which generates an active current command value so that the first representative value follows the overall voltage command value, and
a current control unit which generates the first voltage command value so that active current of the power converter follows the active current command value and reactive current of the power converter follows a reactive current command value.

Thus, the voltages of the DC capacitors of all the converter cells are kept within a certain range, whereby overvoltage of each converter cell can be prevented.

In addition, the individual balance control unit generates the individual modulation commands on the basis of deviations between the third representative values and the DC capacitor voltages of all the converter cells, AC current of the AC grid, and DC current of the DC grid.

Thus, DC capacitor voltages of the converter cells can be averaged, whereby overvoltage of each converter cell can be prevented.

In addition, the positive-negative balance control unit performs control so that the deviation of the third representative values becomes zero between the positive arm and the negative arm of the leg circuit for each phase, to generate a circulation current command value for positive-negative balance, and
the phase balance control unit generates a circulation current command value for phase balance so that each second representative value follows the first representative value, and generates the second voltage command value so that circulation current circulating among the phases of the leg circuits follows a value obtained by adding the circulation current command value for phase balance and the circulation current command value for positive-negative balance outputted from the positive-negative balance control unit.

Thus, the DC capacitor voltages of the converter cells can be averaged among the phases and between the arms, whereby overvoltage of each converter cell can be prevented.

In addition, the phase balance control unit includes filters for removing a frequency that is two times a grid frequency of the AC grid, from the second representative values.

Thus, the DC capacitor voltages of the converter cells are kept within a certain range, whereby overvoltage of each converter cell can be prevented.

In addition, the positive-negative balance control unit includes filters for removing the same frequency as a grid frequency of the AC grid and a frequency that is two times the grid frequency of the AC grid, from the third representative values.

Thus, the DC capacitor voltages of the converter cells are kept within a certain range, whereby overvoltage of each converter cell can be prevented.

In addition, the individual balance control unit includes filters for removing the same frequency as a grid frequency of the AC grid and a frequency that is two times the grid frequency of the AC grid, from deviations between the DC capacitor voltages of all the converter cells and the third representative values.

Thus, the DC capacitor voltages of the converter cells are kept within a certain range, whereby overvoltage of each converter cell can be prevented.

In addition, the gate signal generation unit generates gate signals for the semiconductor switching elements of the respective converter cells in accordance with modulation commands obtained by adding the arm modulation commands and the individual modulation commands.

Thus, the DC capacitor voltages of the converter cells are kept within a certain range and the DC capacitor voltages of the converter cells are averaged, whereby overvoltage of the converter cells can be prevented.

Embodiment 2

Figure 12:
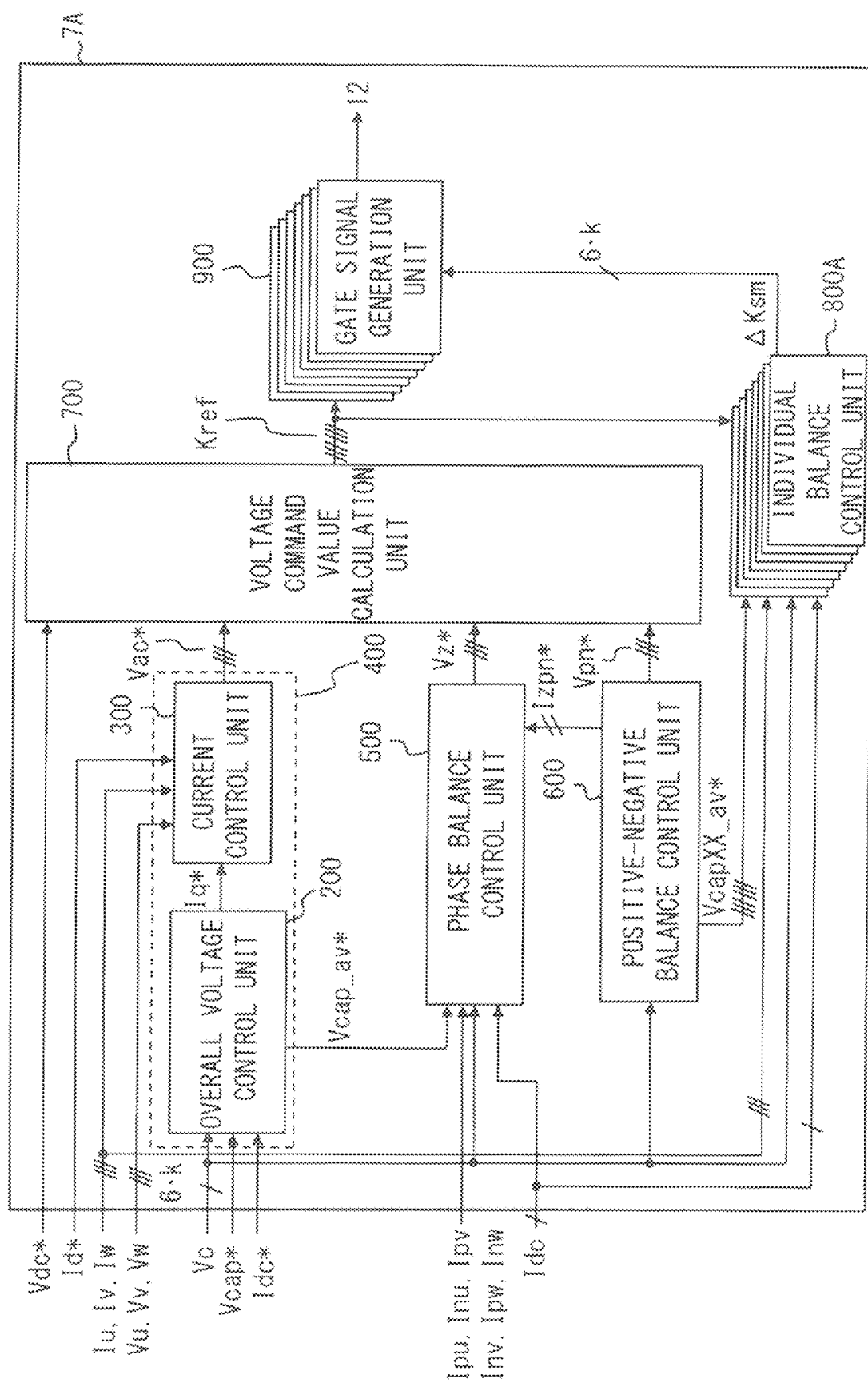
FIG. 12 is a block diagram showing a control device of a power conversion device according to embodiment 2.

FIG. 12 is a block diagram showing a control device of a power conversion device according to embodiment 2.

A control device 7A in embodiment 2 includes the first voltage control unit 400 including the overall voltage control unit 200 and the current control unit 300, the phase balance control unit 500, the positive-negative balance control unit 600, the voltage command value calculation unit 700, an individual balance control unit 800A, and the gate signal generation unit 900.

As compared to the control device 7 in embodiment 1, the control device 7A in embodiment 2 is different in the configuration of the individual balance control unit 800A and is different in that the individual balance control unit 800A receives the modulation commands Kref outputted from the voltage command value calculation unit 700.

Control operations other than that in the individual balance control unit 800A are the same as those in embodiment 1, and therefore the description thereof is omitted.

Figure 13:
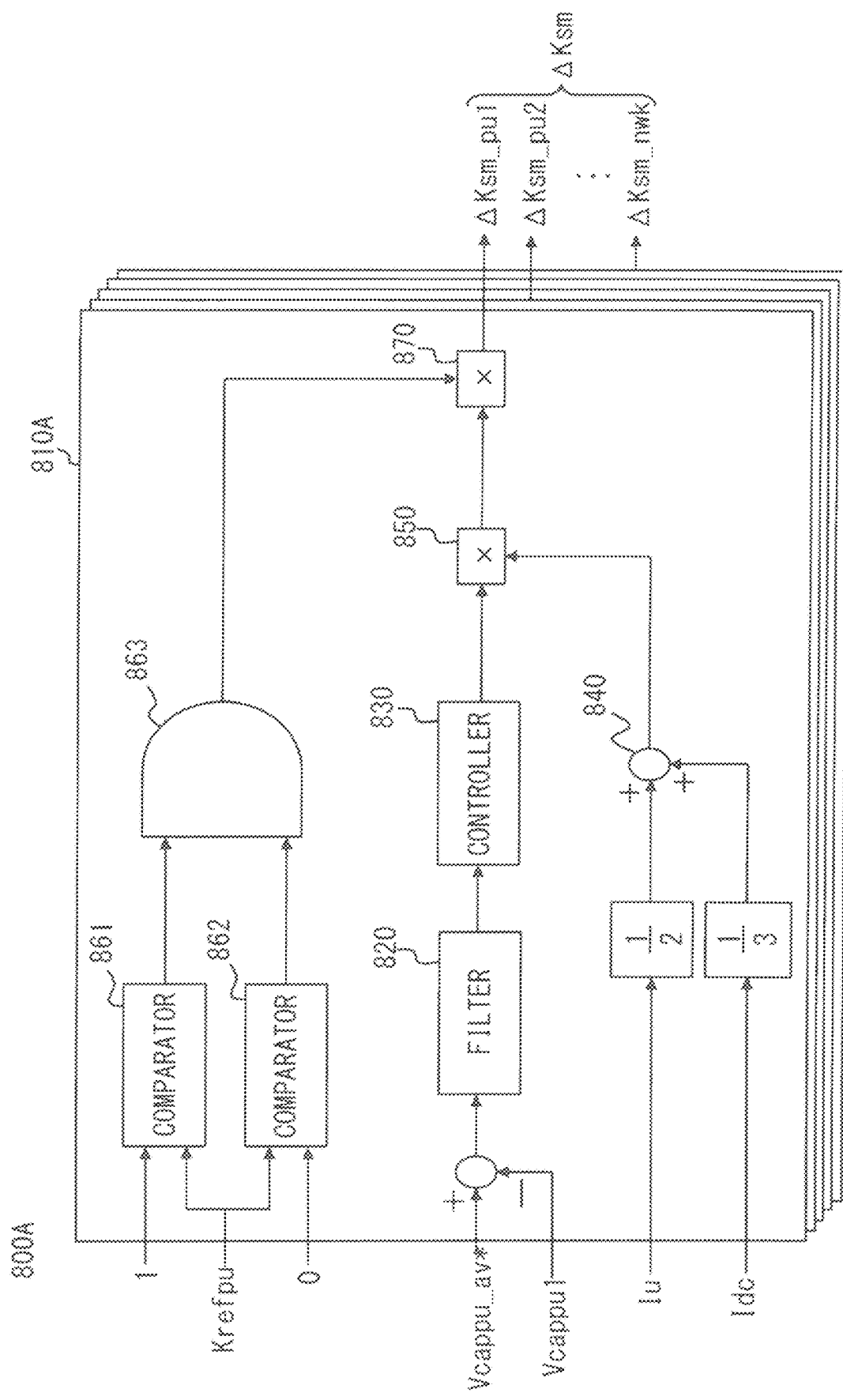
FIG. 13 is a block diagram showing an individual balance control unit of the power conversion device according to embodiment 2.

FIG. 13 shows a block diagram of the individual balance control unit 800A, and in particular, is a block diagram showing a control unit 810A corresponding to one converter cell 10 in the individual balance control unit 800A. Here, the control unit 810A shown in FIG. 13 corresponds to one converter cell 10A (see FIG. 1) in the U-phase positive arm.

With reference to FIG. 11, control in the individual balance control unit 800A will be described using one converter cell 10A in the U-phase positive arm as a representative example.

As in the individual balance control unit 810 in embodiment 1, in the individual balance control unit 810A in embodiment 2, a value obtained by filtering, through the filter 820, the voltage deviation between the average-value corresponding value (third representative value) Vcapp_u_av* of the DC capacitor voltages in the U-phase positive arm and the DC capacitor voltage Vcappu1 of the converter cell 10, is subjected to proportional control by the controller 830. Then, the output value of the controller 830 is multiplied by the sum of the DC current ($\frac{1}{3} \times$Idc) and the AC current ($\frac{1}{2} \times$Iu) for each phase, at the multiplier 850, whereby a voltage component having the same phase as current of each converter cell 10 is calculated, thus generating the individual control voltage command $\Delta$Vsm_pu1. Then, the individual control voltage command $\Delta$Vsm_pu1 is divided by a value corresponding to the DC capacitor voltage Vcappu1, whereby the individual control modulation command $\Delta$Ksm_pu1 is generated.

Meanwhile, the individual balance control unit 810A receives the arm modulation command Krefpu for the U-phase positive arm outputted from the voltage command value calculation unit 700. Then, the arm modulation command Krefpu and 0 are compared by a comparator 861, and the arm modulation command Krefpu and 1 are compared by a comparator 862. Then, if $0 \leq$Krefpu$\leq 1$ is satisfied, a logical conjunction circuit 863 outputs 1, and if Krefpu$<0$ or Krefpu$>1$ is satisfied, the logical conjunction circuit 863 outputs 0. The output value of the multiplier 850 is multiplied by the output value of the logical conjunction circuit 863, at a multiplier 870.

That is, if the arm modulation command Krefpu for the U-phase positive arm is smaller than 0 or greater than 1 (Krefpu<0 or Krefpu>1), output of the logical conjunction circuit 863 becomes 0, so that 0 is multiplied at the multiplier 870. Thus, if the modulation command Krefpu is smaller than 0 and greater than 1, 0 is outputted as the individual control arm modulation command ΔKsm.

Therefore, if the arm modulation command outputted from the voltage command value calculation unit 700 is smaller than 0 or greater than 1, output from the individual balance control unit 800A becomes zero, so that, in the gate signal generation unit 900, the arm modulation command Kref (Krefup, Krefun, Krefvp, Krefvn, Krefwp, Krefnw) outputted from the voltage command value calculation unit 700 becomes the modulation command for each converter cell 10. Then, the gate signal generation unit 900 generates signals for performing PWM control for the gates of the semiconductor switching elements 12 of the respective converter cells 10 on the basis of the arm modulation commands Kref.

As described above, according to embodiment 2, the same effects as in embodiment 1 can be obtained.

In addition, the individual balance control unit makes each individual modulation command be zero in accordance with a value of the arm modulation command generated by the voltage command value calculation unit.

Thus, only in a necessary case in accordance with the value of the arm modulation command generated by the voltage command value calculation unit, the individual balance control is made valid, whereby switching loss in the semiconductor switching elements of the converter cells can be reduced while the DC capacitor voltages can be stabilized in a certain range.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 power converter
2 AC grid
7 control device
8, 8u, 8v, 8w leg circuit
9, 9pu, 9pv, 9pw, 9nu, 9nv, 9nw arm
10 converter cell
12 semiconductor switching element
15 DC capacitor
16 voltage sensor
20 voltage sensor
30 current sensor
40 current sensor
60 current sensor
100 power conversion device
200 overall voltage control unit
210 first representative value calculation unit
220 controller
300 current control unit
310 three-phase/two-phase converter
311 phase detector
320, 330 controller
350 two-phase/three-phase converter
400 first voltage control unit
500 phase balance control unit
510 second representative value calculation unit
511, 512, 513 filter
520 three-phase/two-phase converter
521, 522 controller
531, 532 controller
540 two-phase/three-phase converter
550 circulation current calculation unit
560 three-phase/two-phase converter
600 positive-negative balance control unit
610 third representative value calculation unit
621, 622, 623 filter
631, 632, 633 controller
660 three-phase/two-phase converter
671, 672, 673 controller
700 voltage command value calculation unit
800, 800A individual balance control unit
820 filter
830 controller
810, 810A individual balance control unit
861, 862 comparator
863 logical conjunction circuit
900 gate signal generation unit
1000 processor
1001 storage device
Vcap DC capacitor voltage
Vu, Vv, Vw AC voltage
Iu, Iv, Iw AC current
Ipu, Inu, Ipv, Inv, Ipw, Inw arm current
Vdc DC voltage
Idc DC current
Idc* DC current command value
Id* reactive current command value
Iq* active current command value
Vcap_av* first representative value
Vdc* DC voltage command value
Vac*, Vacu*, Vacv*, Vacw* first voltage command value (AC voltage command value)
Vz*, VzU*, VzV*, VzW* second voltage command value (voltage command value for circulation current)
Vpn*, VpnU*, VpnV*, VpnW* third voltage command value (AC voltage command value for positive-negative balance)
Kref arm modulation command
ΔKsm individual modulation command

The invention claimed is:

1. A power conversion device comprising:
a power converter which performs power conversion between an AC grid with a plurality of phases and a DC grid; and
a control device which controls the power converter, wherein
the power converter includes leg circuits respectively corresponding to the plurality of phases of AC, the leg circuits each having a pair of a positive arm and a negative arm connected in series, each of the positive arm and the negative arm includes one converter cell or a plurality of converter cells connected in series, the one or each converter cell including a series unit of a plurality of semiconductor switching elements connected in series and a DC capacitor connected in parallel to the series unit, a connection point between the positive arm and the negative arm is connected to the AC grid, and the plurality of leg circuits are connected in parallel between positive and negative DC buses of the DC grid, and the control device includes
- a first voltage control circuitry which performs control so that a first representative value which is an average-value corresponding value of DC capacitor voltages of all the converter cells follows a predetermined overall voltage command value, to generate a first voltage command value,
- a phase balance control circuitry which performs control so that a second representative value which is an average-value corresponding value of the DC capacitor voltages of the converter cells in the leg circuit for each phase follows the first representative value, to generate a second voltage command value,
- a positive-negative balance control circuitry which performs control so that a deviation of third representative values which are average-value corresponding values of the DC capacitor voltages of the converter cells in the positive arm and the negative arm of the leg circuit for each phase becomes zero between the positive arm and the negative arm of the leg circuit for each phase, to generate a third voltage command value,
- a voltage command value calculation circuitry which generates an arm modulation command for each arm on the basis of the first voltage command value, the second voltage command value, and the third voltage command value,
- an individual balance control circuitry which performs control so that the DC capacitor voltages of all the converter cells follow the third representative values, to generate individual modulation commands for the respective converter cells, and
- a gate signal generation circuitry which generates drive signals for the semiconductor switching elements on the basis of the arm modulation commands and the individual modulation commands.

2. The power conversion device according to claim 1, wherein
the first voltage control circuitry includes
- an overall voltage control circuitry which generates an active current command value so that the first representative value follows the overall voltage command value, and
- a current control circuitry which generates the first voltage command value so that active current of the power converter follows the active current command value and reactive current of the power converter follows a reactive current command value.

3. The power conversion device according to claim 2, wherein
the individual balance control circuitry generates the individual modulation commands on the basis of deviations between the third representative values and the DC capacitor voltages of all the converter cells, AC current of the AC grid, and DC current of the DC grid.

4. The power conversion device according to claim 3, wherein
the individual balance control circuitry makes each individual modulation command be zero in accordance with a value of the arm modulation command generated by the voltage command value calculation circuitry.

5. The power conversion device according to claim 4, wherein
the positive-negative balance control circuitry performs control so that the deviation of the third representative values becomes zero between the positive arm and the negative arm of the leg circuit for each phase, to generate a circulation current command value for positive-negative balance, and
the phase balance control circuitry generates a circulation current command value for phase balance so that each second representative value follows the first representative value, and generates the second voltage command value so that circulation current circulating among the phases of the leg circuits follows a value obtained by adding the circulation current command value for phase balance and the circulation current command value for positive-negative balance outputted from the positive-negative balance control circuitry.

6. The power conversion device according to claim 2, wherein
the individual balance control circuitry makes each individual modulation command be zero in accordance with a value of the arm modulation command generated by the voltage command value calculation circuitry.

7. The power conversion device according to claim 6, wherein
the positive-negative balance control circuitry performs control so that the deviation of the third representative values becomes zero between the positive arm and the negative arm of the leg circuit for each phase, to generate a circulation current command value for positive-negative balance, and
the phase balance control circuitry generates a circulation current command value for phase balance so that each second representative value follows the first representative value, and generates the second voltage command value so that circulation current circulating among the phases of the leg circuits follows a value obtained by adding the circulation current command value for phase balance and the circulation current command value for positive-negative balance outputted from the positive-negative balance control circuitry.

8. The power conversion device according to claim 2, wherein
the positive-negative balance control circuitry performs control so that the deviation of the third representative values becomes zero between the positive arm and the negative arm of the leg circuit for each phase, to generate a circulation current command value for positive-negative balance, and
the phase balance control circuitry generates a circulation current command value for phase balance so that each second representative value follows the first representative value, and generates the second voltage command value so that circulation current circulating among the phases of the leg circuits follows a value obtained by adding the circulation current command value for phase balance and the circulation current command value for positive-negative balance outputted from the positive-negative balance control circuitry.

9. The power conversion device according to claim 3, wherein
the positive-negative balance control circuitry performs control so that the deviation of the third representative values becomes zero between the positive arm and the negative arm of the leg circuit for each phase, to generate a circulation current command value for positive-negative balance, and
the phase balance control circuitry generates a circulation current command value for phase balance so that each second representative value follows the first representative value, and generates the second voltage command value so that circulation current circulating among the phases of the leg circuits follows a value obtained by adding the circulation current command value for phase balance and the circulation current command value for positive-negative balance outputted from the positive-negative balance control circuitry.

10. The power conversion device according to claim 1, wherein
the individual balance control circuitry generates the individual modulation commands on the basis of deviations between the third representative values and the DC capacitor voltages of all the converter cells, AC current of the AC grid, and DC current of the DC grid.

11. The power conversion device according to claim 10, wherein
the individual balance control circuitry makes each individual modulation command be zero in accordance with a value of the arm modulation command generated by the voltage command value calculation circuitry.

12. The power conversion device according to claim 11, wherein
the positive-negative balance control circuitry performs control so that the deviation of the third representative values becomes zero between the positive arm and the negative arm of the leg circuit for each phase, to generate a circulation current command value for positive-negative balance, and
the phase balance control circuitry generates a circulation current command value for phase balance so that each second representative value follows the first representative value, and generates the second voltage command value so that circulation current circulating among the phases of the leg circuits follows a value obtained by adding the circulation current command value for phase balance and the circulation current command value for positive-negative balance outputted from the positive-negative balance control circuitry.

13. The power conversion device according to claim 10, wherein
the positive-negative balance control circuitry performs control so that the deviation of the third representative values becomes zero between the positive arm and the negative arm of the leg circuit for each phase, to generate a circulation current command value for positive-negative balance, and
the phase balance control circuitry generates a circulation current command value for phase balance so that each second representative value follows the first representative value, and generates the second voltage command value so that circulation current circulating among the phases of the leg circuits follows a value obtained by adding the circulation current command value for phase balance and the circulation current command value for positive-negative balance outputted from the positive-negative balance control circuitry.

14. The power conversion device according to claim 1, wherein
the individual balance control circuitry makes each individual modulation command be zero in accordance with a value of the arm modulation command generated by the voltage command value calculation circuitry.

15. The power conversion device according to claim 14, wherein
the positive-negative balance control circuitry performs control so that the deviation of the third representative values becomes zero between the positive arm and the negative arm of the leg circuit for each phase, to generate a circulation current command value for positive-negative balance, and
the phase balance control circuitry generates a circulation current command value for phase balance so that each second representative value follows the first representative value, and generates the second voltage command value so that circulation current circulating among the phases of the leg circuits follows a value obtained by adding the circulation current command value for phase balance and the circulation current command value for positive-negative balance outputted from the positive-negative balance control circuitry.

16. The power conversion device according to claim 1, wherein
the positive-negative balance control circuitry performs control so that the deviation of the third representative values becomes zero between the positive arm and the negative arm of the leg circuit for each phase, to generate a circulation current command value for positive-negative balance, and
the phase balance control circuitry generates a circulation current command value for phase balance so that each second representative value follows the first representative value, and generates the second voltage command value so that circulation current circulating among the phases of the leg circuits follows a value obtained by adding the circulation current command value for phase balance and the circulation current command value for positive-negative balance outputted from the positive-negative balance control circuitry.

17. The power conversion device according to claim 1, wherein
the phase balance control circuitry includes filters for removing a frequency that is two times a grid frequency of the AC grid, from the second representative values.

18. The power conversion device according to claim 1, wherein
the positive-negative balance control circuitry includes filters for removing the same frequency as a grid frequency of the AC grid and a frequency that is two times the grid frequency of the AC grid, from the third representative values.

19. The power conversion device according to claim 1, wherein
the individual balance control circuitry includes filters for removing the same frequency as a grid frequency of the AC grid and a frequency that is two times the grid frequency of the AC grid, from deviations between the DC capacitor voltages of all the converter cells and the third representative values.

20. The power conversion device according to claim 1, wherein
the gate signal generation circuitry generates gate signals for the semiconductor switching elements of the respective converter cells in accordance with modulation commands obtained by adding the arm modulation commands and the individual modulation commands.

\* \* \* \* \*